United States Patent
Terry et al.

(10) Patent No.: US 11,106,871 B2
(45) Date of Patent: Aug. 31, 2021

(54) SYSTEMS AND METHODS FOR CONFIGURABLE MESSAGING RESPONSE-ACTION ENGINE

(71) Applicant: Conversica, Inc., Foster City, CA (US)

(72) Inventors: George Alexis Terry, Woodside, CA (US); Werner Koepf, Seattle, WA (US); James D. Harriger, Duvall, WA (US); Joseph M. Silverbears, Ferndale, WA (US); William Dominic Webb-Purkis, San Francisco, CA (US); Macgregor S. Gainor, Bellingham, WA (US); Ryan Francis Ginstrom, Snohomish, WA (US); Siddhartha Reddy Jonnalagadda, Bothell, WA (US)

(73) Assignee: CONVERSICA, INC., Foster City, CA (US)

( * ) Notice: Subject to any disclaimer, the term of this patent is extended or adjusted under 35 U.S.C. 154(b) by 114 days.

(21) Appl. No.: 16/168,737

(22) Filed: Oct. 23, 2018

(65) Prior Publication Data

US 2019/0121856 A1 Apr. 25, 2019

Related U.S. Application Data

(63) Continuation-in-part of application No. 16/019,382, filed on Jun. 26, 2018, which is a continuation-in-part
(Continued)

(51) Int. Cl.
*G06F 40/30* (2020.01)
*G06N 20/00* (2019.01)
(Continued)

(52) U.S. Cl.
CPC ............. *G06F 40/30* (2020.01); *G06N 3/006* (2013.01); *G06N 5/022* (2013.01); *G06N 20/00* (2019.01);
(Continued)

(58) Field of Classification Search
CPC ...................................................... G06F 40/30
(Continued)

(56) References Cited

U.S. PATENT DOCUMENTS

| 7,275,083 B1 | 9/2007 | Seibel et al. |
| 7,512,580 B2 | 3/2009 | Ronnewinkel |

(Continued)

OTHER PUBLICATIONS

USPTO, ISA/US, "Notification of Transmittal of the ISR and the WO of the International Searching Authority or The Declaration", in PCT Application No. PCT/US2016/014650, dated May 6, 2016, 12 pages.

(Continued)

*Primary Examiner* — Syling Yen
(74) *Attorney, Agent, or Firm* — Kang S. Lim

(57) ABSTRACT

Systems and methods for a configurable response-action engine are provided. Actions are generated for a conversation when an insight is received from a natural language processing system. Industry, segment, client specific instructions, third party data, a state for the lead and lead historical patterns are also received. A decision making action model is tuned using this information. An objective for the conversation may be extracted from the state information for the lead. The tuned model is then applied to the insight and objective to output an action. A response message may be generated for the action. The action is directed to cause a state transition of the lead to a preferred state. In another embodiment, systems and methods are presented for feature extraction from one or more messages. In yet other embodi-
(Continued)

ments, systems and methods for message cadence optimization are provided.

10 Claims, 20 Drawing Sheets

Related U.S. Application Data of application No. 14/604,610, filed on Jan. 23, 2015, now Pat. No. 10,026,037, and a continuation-in-part of application No. 14/604,602, filed on Jan. 23, 2015, now Pat. No. 11,042,910, and a continuation-in-part of application No. 14/604,594, filed on Jan. 23, 2015, now Pat. No. 10,803,479.

(60) Provisional application No. 62/577,635, filed on Oct. 26, 2017.

(51) Int. Cl.
*G06N 3/00* (2006.01)
*G06N 5/02* (2006.01)
G06N 5/04 (2006.01)
G06N 7/00 (2006.01)
G06N 3/04 (2006.01)

(52) U.S. Cl.
CPC .............. *G06N 3/04* (2013.01); *G06N 5/046* (2013.01); *G06N 7/005* (2013.01)

(58) Field of Classification Search
USPC ........................................................ 707/758
See application file for complete search history.

(56) References Cited

U.S. PATENT DOCUMENTS

| | | | | |
|---|---|---|---|---|
| 8,000,973 | B2 * | 8/2011 | Williams | H04M 3/493 704/275 |
| 8,099,316 | B2 | 1/2012 | Moukas et al. | |
| 8,364,467 | B1 | 1/2013 | Bowman et al. | |
| 8,666,742 | B2 | 3/2014 | Detlef et al. | |
| 8,781,882 | B1 * | 7/2014 | Arboletti | G06Q 10/0639 705/7.39 |
| 8,787,553 | B2 | 7/2014 | Fan et al. | |
| 9,367,814 | B1 | 6/2016 | Lewis et al. | |
| 2002/0152102 | A1 | 10/2002 | Brodersen et al. | |
| 2004/0103051 | A1 | 5/2004 | Reed et al. | |
| 2004/0254676 | A1 * | 12/2004 | Blust | G07F 7/069 700/231 |
| 2005/0080613 | A1 | 4/2005 | Colledge et al. | |
| 2005/0105712 | A1 | 5/2005 | Williams et al. | |
| 2006/0004642 | A1 | 1/2006 | Libman | |
| 2007/0112714 | A1 * | 5/2007 | Fairweather | G06F 9/4493 706/46 |
| 2007/0129993 | A1 | 6/2007 | Alvin | |
| 2007/0233692 | A1 | 10/2007 | Lisa et al. | |
| 2008/0254419 | A1 * | 10/2008 | Cohen | G09B 5/06 434/219 |
| 2009/0018996 | A1 * | 1/2009 | Hunt | G06F 16/2264 |
| 2009/0119095 | A1 | 5/2009 | Begglman et al. | |
| 2010/0131835 | A1 * | 5/2010 | Kumar | G06Q 30/0255 715/205 |
| 2011/0179114 | A1 * | 7/2011 | Dilip | G06F 16/9535 709/204 |
| 2012/0245925 | A1 | 9/2012 | Guha | |
| 2013/0046531 | A1 | 2/2013 | Chandramouli | |
| 2013/0086188 | A1 | 4/2013 | Mays et al. | |
| 2013/0346067 | A1 | 12/2013 | Bhatt | |
| 2014/0195354 | A1 | 7/2014 | Pokonosky | |
| 2014/0222854 | A1 | 8/2014 | Lee et al. | |
| 2014/0278958 | A1 | 9/2014 | Nukala et al. | |
| 2014/0280184 | A1 | 9/2014 | Swaminathan et al. | |
| 2014/0280225 | A1 | 9/2014 | Southern-Boukerrou | |
| 2014/0280623 | A1 | 9/2014 | Duan | |
| 2014/0288920 | A1 | 9/2014 | Proux | |
| 2015/0019305 | A1 | 1/2015 | Gorawala | |
| 2015/0229531 | A1 * | 8/2015 | O'Sullivan | G06Q 50/01 709/223 |
| 2015/0324347 | A1 | 11/2015 | Bradshaw et al. | |
| 2015/0350144 | A1 | 12/2015 | Zeng et al. | |
| 2015/0365527 | A1 | 12/2015 | Chakravarthy | |
| 2016/0085839 | A1 | 3/2016 | D'Halluin et al. | |
| 2016/0217500 | A1 | 7/2016 | Brigham et al. | |
| 2016/0379213 | A1 * | 12/2016 | Isaacson | G06F 3/048 705/44 |
| 2017/0006135 | A1 * | 1/2017 | Siebel | G06F 8/10 |

OTHER PUBLICATIONS

USPTO, ISA/US, "Notification of Transmittal of the ISR and the WO of the International Searching Authority or The Declaration", in PCT Application No. PCT/US2018/051827, dated Feb. 5, 2019, 10 pages.

USPTO, ISA/US, "Notification of Transmittal of the ISR and the WO of the International Searching Authority or The Declaration", in PCT Application No. PCT/US2018/057589, dated Feb. 27, 2019, 11 pages.

USPTO, ISA/US, "Notification of Transmittal of the ISR and the WO of the International Searching Authority or The Declaration", dated May 6, 2016, 12 pages.

USPTO, ISA/US, "Notification of Transmittal of the ISR and the WO of the International Searching Authority or The Declaration", dated Feb. 5, 2019, 10 pages.

* cited by examiner

SYSTEMS AND METHODS FOR CONFIGURABLE MESSAGING RESPONSE-ACTION ENGINE

CROSS REFERENCE TO RELATED APPLICATIONS

This continuation-in-part application is a non-provisional and claims the benefit of U.S. provisional application entitled "Systems and Methods for Configurable Messaging Response-Action Engine," U.S. application No. 62/577,635, filed in the USPTO on Oct. 26, 2017.

This continuation-in-part application also claims the benefit of U.S. application entitled "Systems and Methods for Natural Language Processing and Classification," U.S. application Ser. No. 16/019,382, filed in the USPTO on Jun. 26, 2018, which is a continuation-in-part application which claims the benefit of U.S. application entitled "Systems and Methods for Configuring Knowledge Sets and AI Algorithms for Automated Message Exchanges," U.S. application Ser. No. 14/604,610, filed in the USPTO on Jan. 23, 2015, now U.S. Pat. No. 10,026,037 issued Jul. 17, 2018. Additionally, U.S. application Ser. No. 16/019,382 claims the benefit of U.S. application entitled "Systems and Methods for Processing Message Exchanges Using Artificial Intelligence," U.S. application Ser. No. 14/604,602, filed in the USPTO on Jan. 23, 2015, and U.S. application entitled "Systems and Methods for Management of Automated Dynamic Messaging," U.S. application Ser. No. 14/604,594, filed in the USPTO on Jan. 23, 2015.

This application is also related to and concurrently filed in the USPTO on Oct. 23, 2018, U.S. application Ser. No. 16/168,763, entitled "Systems and Methods for Configurable Messaging with Feature Extraction", and U.S. application Ser. No. 16/168,779, entitled "Systems and Methods for Message Cadence Optimization".

All of the above-referenced applications/patents are incorporated herein in their entirety by this reference.

BACKGROUND

The present invention relates to systems and methods for a configurable response-action engine for improved message response generation, primarily in the context of the generation and management of a dynamic messaging campaign. Such systems and methods provide a wide range of business people more efficient tools for prospect management and other types of outreach, and also improve computer functioning as it relates to processing documents for meaning. In turn, such system and methods enable more productive business conversations. An example scenario discussed is sales where the system enhances sales activity, increased profits, and more efficient allocation of sales resources.

Currently organizations in a business such as sales, marketing, customer service, customer success, recruiting, and HR departments operate passively and actively. For example, passive sales activity includes providing a general offer for sale of products and/or services to the public and waiting for customers to make the initial contact. In contrast, active sales techniques involve the seller reaching out to consumers directly. The benefit of active approaches is that the actors, such as customers, can be targeted more effectively, and decisions may be more effectively influenced. Active sales techniques (and similar techniques in other business organizations) may include unsolicited "cold calls", or may include following up with "leads" who have responded to some advertisement, or who has been purchased from a marketing firm. While cold calling and similar techniques have their place, continuing a dialog with an established actor, such as a sales lead, is by far the most targeted and effective means of business activity in sales and other organizations.

Active techniques have been around for as long as commerce has been occurring. For example, sellers traditionally hawked their wares via in-person solicitation or fliers. Indeed, to this day, advertisements are routinely sent via postal mail to consumers. When available these mailed advertisements include degrees of customization, such as inclusion of the actor's (in this example, receiver's) name printed on the advertisement.

With the advancement of technology, so too have active techniques evolved. With the widespread use of telephones, calls by actors belonging to business organizations became a staple of active techniques in sales, marketing and other business functions. For example, this initially took the form of sales people "cold calling" prospective customers. "Robocalls" have become more popular recently due to the ability to reach much wider audiences with very little additional resource expenditure.

As the internet has become a more prominent feature of commerce, on-line ads and email campaigns have joined the arsenal of business departments as ways to engage actors such as a potential consumer. For example, email marketing in particular has become a very effective and frequently utilized means of reaching customers. For large actor populations, these emails are typically minimally tailored advertisements. For smaller actor groups, individual emails may still be crafted by actors from business organizations such as sales associates; however this activity (while more effective) is often very time consuming. Additionally, a business actor can usually only engage in a limited number of these correspondences without the use of contact management software.

As documented in our prior patents (U.S. application Ser. Nos. 14/604,594, 14/604,602 and 14/604,610), AI processing ability and knowledge sets have allowed for more, and more sophisticated, automation of such activities in a dynamic manner that appears to be human generated. This enables the far reach of a "robocall" style campaign for marketing and other activities, while still maintaining the effectiveness or more traditional tailored outreach campaigns for business functions such as sales and marketing. However, with the access to more capable AI systems for marketing and other business functions such as those documented in previous patents identified above, there arises a need for users of such systems to cooperate more closely with the AI to get the best functionality out of these systems, and improve the AI's functioning. Likewise, these systems depend upon accurate and effective classification of documents to operate correctly. Without effective natural language processing, these automated engagement systems are stymied.

It is therefore apparent that an urgent need exists for advancements in the response elements of a message response system that takes into consideration a variety of factors in order to tailor responses in the most compelling manner possible.

SUMMARY

To achieve the foregoing and in accordance with the present invention, systems and methods for a configurable response-action engine are provided.

In some embodiments, actions are generated for a conversation when an insight is received from a natural language processing system. Industry, segment, client specific instructions, third party data, a state for the lead, and lead historical patterns are also received. A decision making action model is tuned using this information. An objective for the conversation may be extracted from the state information for the lead. The tuned model is then applied to the insight and objective to output an action. A response message may be generated for the action. The action is directed to cause a state transition of the lead to a preferred state.

The decision making action model is independent from the natural language processing AI model, and may be a machine learning model. The decision making action model is trained by annotating the message with actions. The annotation is performed in the client domain.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
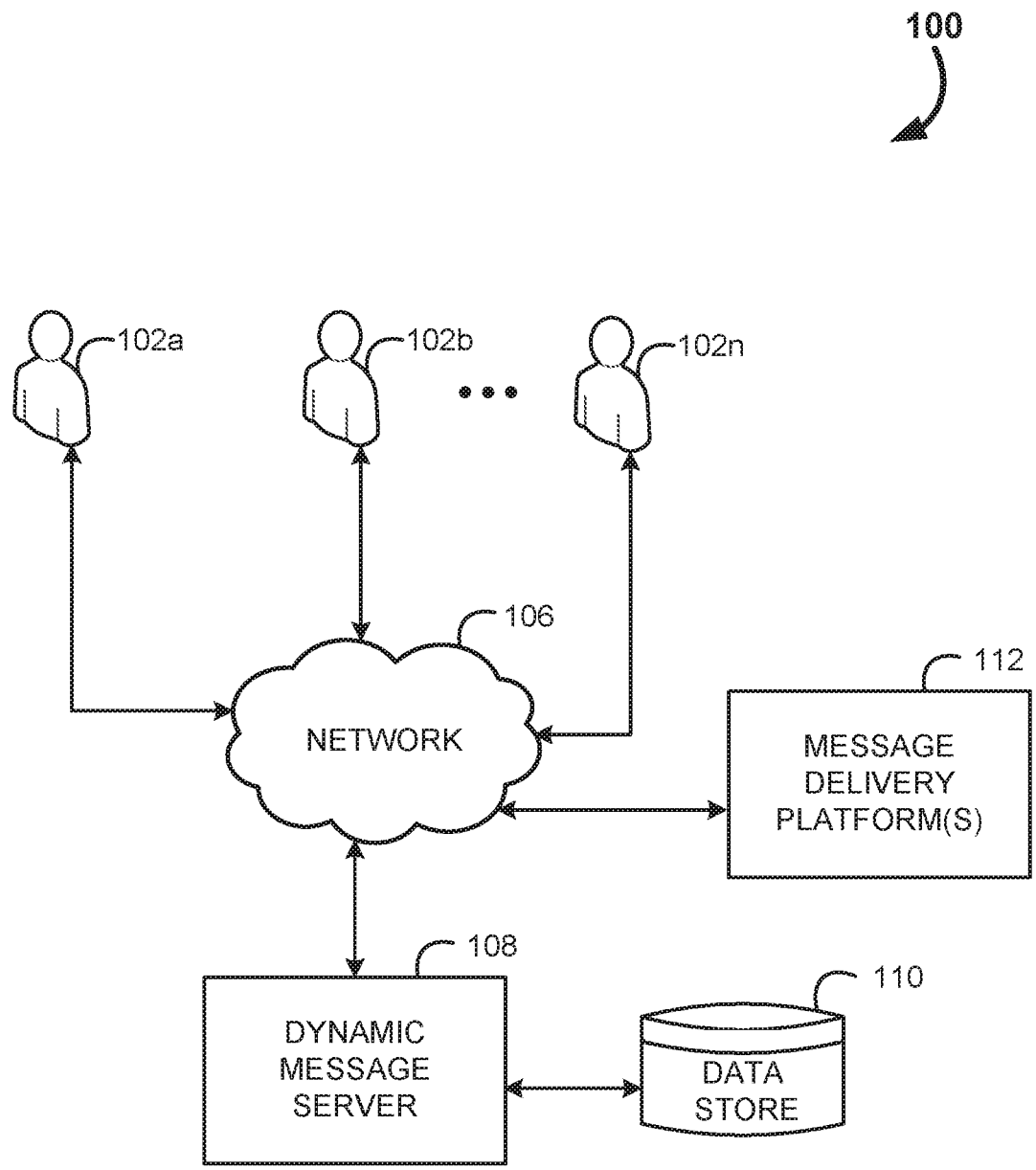
FIG. 1 is an example logical diagram of a system for generation and implementation of messaging campaigns, in accordance with some embodiment.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to cooperation between business actors such as human operators and AI systems. While such systems and methods may be utilized with any AI system, such cooperation systems particularly excel in AI systems relating to the generation of automated messaging for marketing and other sales functions. While the following disclosure is applicable for other combinations, we will focus upon mechanisms of cooperation between human operators and AI marketing systems as an example, to demonstrate the context within which the cooperation system excels.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. Definitions

The following systems and methods for dynamic messaging a campaign relies upon an interplay of user interaction, and sophisticates artificial intelligence (AI) processing of received messages. The goal of the message campaign is to enable a logical dialog exchange with a recipient, where the recipient is not necessarily aware that they are communicating with an automated machine as opposed to a human user. This may be most efficiently performed via a written dialog, such as email, text messaging, chat, etc. However, it is entirely possible that given advancement in audio and video processing, it may be entirely possible to have the dialog include audio or video components as well.

In order to effectuate such an exchange, an AI system is employed within an AI platform within the messaging system to process the responses and generate conclusions regarding the exchange. These conclusions include calculating the context of a document, insights, sentiment and confidence for the conclusions. Given that these terms are not readily familiar outside of the field of natural language processing, a series of definitions are provided in order to clarify the terminology:

accuracy—the quantitative evaluation of how reliable and comprehensive the system classifications are. We formally define it as the sum of all instances of inputs where the system classification is correct as annotated by a business actor (sales person, linguistic annotator, etc.) divided by the total number of instances.

(AI) algorithm—a method employed to calculate the weight of a document in a particular category.

aspect—a specific AI algorithm. Example: Naive Bayes, Sentiment.

attempt—a single message in a series for a campaign.

AI Trainer—term for the tool used to classify a document that the aspects were not confident scoring.

campaign—a set of possible messaging designed to be sent out to a lead over the course of a conversation depending on the receipt and classification of responses (or lack thereof).

categorization—the process in which ideas and objects are recognized, differentiated, and understood, generally into categories.

category—possible answers to the insight they belong to. Example: Insight: "Continue messaging?" has categories: "Stop" and "Continue".

classification—another word for categorization.

confidence—a calculated probability that the categorization is correct.

context—a collection of documents that have some commonality. Example: "all documents collected from asking 'What is a good phone number?'.", "messages sent from customers in a chat with Bill in customer service".

document—a set of words in a specific order used to convey a meaning.

Hard-rule—an AI algorithm that dictates a category based on a heuristic match involving tokens, regular expression patterns and discourse-level intents and entity classifications.

Hard-rule term—an example of a string in the response that is used by the Hard-rule aspect as part of the overall heuristics.

insight—a collection of categories used to answer some question about a document. Example: "What does this person mean?", "How does this person feel?", "Should we keep emailing this person?"

knowledge set—a set of tokens with their associated category weights used by an aspect during classification.

actor—a person or another entity like an AI system that represents a person who is placed into the system at a certain time for a certain purpose. For example, a lead is placed in our system using for sales conversion under a predefined campaign Alternate terms for 'actor' may include "lead", "contact", "business actor" or the like depending upon use case.

actor (event) history—the notable information for an actor coming into the system, messages sent to that actor, responses received and alerts sent out, in the chronological order of their occurrences.

ngram—denotes the number of words used to make a token. Example: token "yes it is" is a tri-gram or an ngram of 3.

normalization—removing characters/tokens to reduce the complexity of the document without changing the accuracy of classifications.

question—an inquiry included in a message designed to limit the response to a subset of the target language.

response—the document received after sending a message to a lead.

(response) actions—tasks that the system can carry out for a given lead based on the classification of the response.

sentiment classifier—an AI algorithm that is used to gauge how strongly a category expresses itself in a document.

series—a subset of a campaign designed to be sent out until a response is received for that subset of messages. Based on the classification of the response, the system may continue to another series of messaging in that same campaign.

score—a set of probabilities or a positive number between 0 and 1 associated with the set of classifications made by the different aspects for different insights.

The (AI) Platform—the system that allows interaction with, setup, score, and modify the AI algorithms as need be. This also includes the code, databases and servers used for this specific purpose.

term—one or more words used as a single unit to correlate to a category through assigning a weight.

training set—a set of classified documents used to calculate knowledge sets.

weight—the numeric value assigned to a token or document for a category based on the training for a particular algorithm.

word—a combination of characters used to denote meaning in a language.

named entity replacement—grouping a word or set of words into a single token. Example: "Alex", "Sarah", and "Jill" can all be variabilized into the token "_name_".

II. Dynamic Messaging Systems

To facilitate the discussion, FIG. 1 is an example logical diagram of a system for generating and implementing messaging campaigns, shown generally at 100. In this example block diagram, several users 102*a-n* are illustrated engaging a dynamic messaging system 108 via a network 106. Note that messaging campaigns may be uniquely customized by each user 102*a-n* in some embodiments. In alternate embodiments, users may be part of collaborative sales departments (or other collaborative group) and may all have common access to the messaging campaigns. The users 102*a-n* may access the network from any number of suitable devices, such as laptop and desktop computers, work stations, mobile devices, media centers, etc.

The network 106 most typically includes the internet, but may also include other networks such as a corporate WAN, cellular network, corporate local area network, or combination thereof, for example. The messaging server 108 may distribute the generated messages to the various message delivery platforms 112 for delivery to the individual recipients. The message delivery platforms 112 may include any suitable messaging platform. Much of the present disclosure will focus on email messaging, and in such embodiments the message delivery platforms 112 may include email servers (Gmail, yahoo, Hotmail, etc.). However, it should be realized that the presently disclosed systems for messaging are not necessarily limited to email messaging. Indeed, any messaging type is possible under some embodiments of the present messaging system. Thus, the message delivery platforms 112 could easily include a social network interface, instant messaging system, text messaging (SMS) platforms, or even audio telecommunications systems. While audio is possible with the given messaging system, it is often desirable for the recipient to have a seamless experience where the automated messages are virtually indistinguishable from messages authored by a sales associate. Due to inherent difficulties in generating realistically human sounding automated audio (much less imitating a specific sales associate), much of the present disclosure will focus on the generation of written textual messages.

One or more data sources 110 may be available to the messaging server 108 to provide user specific information, message template data, knowledge sets, insights, and lead information. These data sources may be internal sources for the system's utilization, or may include external third-party data sources (such as business information belonging to a customer for whom the campaign is being generated). These information types will be described in greater detail below.

Figure 2:
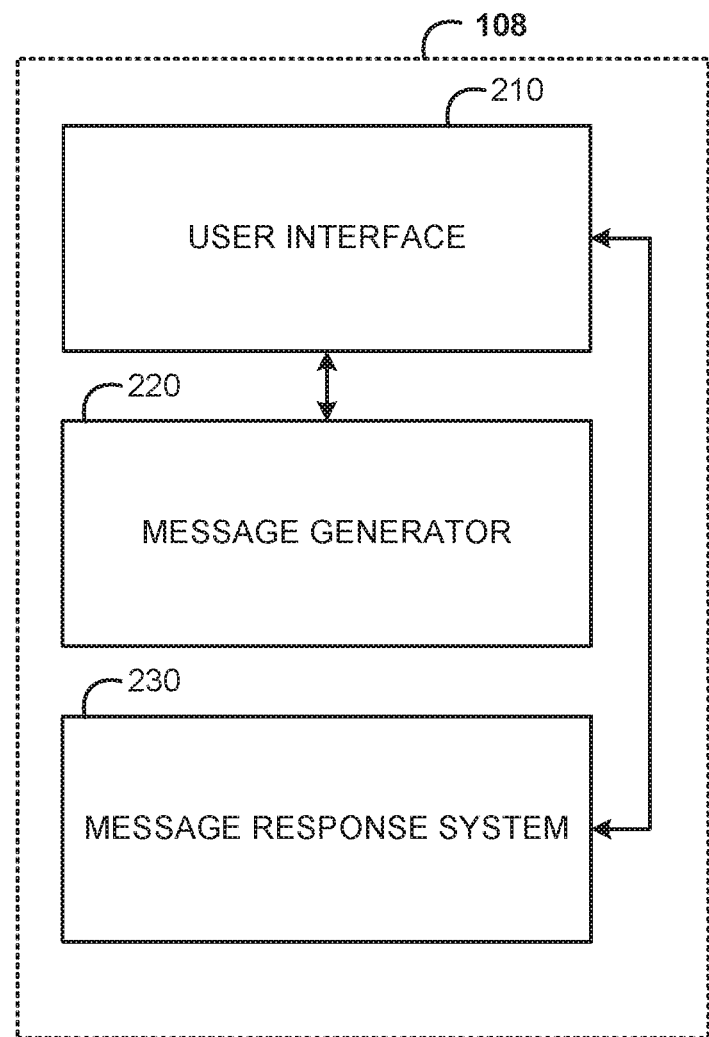
FIG. 2 is an example logical diagram of a dynamic messaging server, in accordance with some embodiment.

Moving on, FIG. 2 provides a more detailed view of the dynamic messaging server 108, in accordance with some embodiment. The server is comprised of three main logical subsystems: a user interface 210, a message generator 220, and a message response system 230. The user interface 210 may be utilized to access the message generator 220 and the message response system 230 to set up messaging campaigns, and manage those campaigns throughout their life cycle. At a minimum, the user interface 210 includes APIs to allow a user's device to access these subsystems. Alternatively, the user interface 210 may include web accessible messaging creation and management tools, as will be explored below in some of the accompanying example screenshots.

Figure 3:
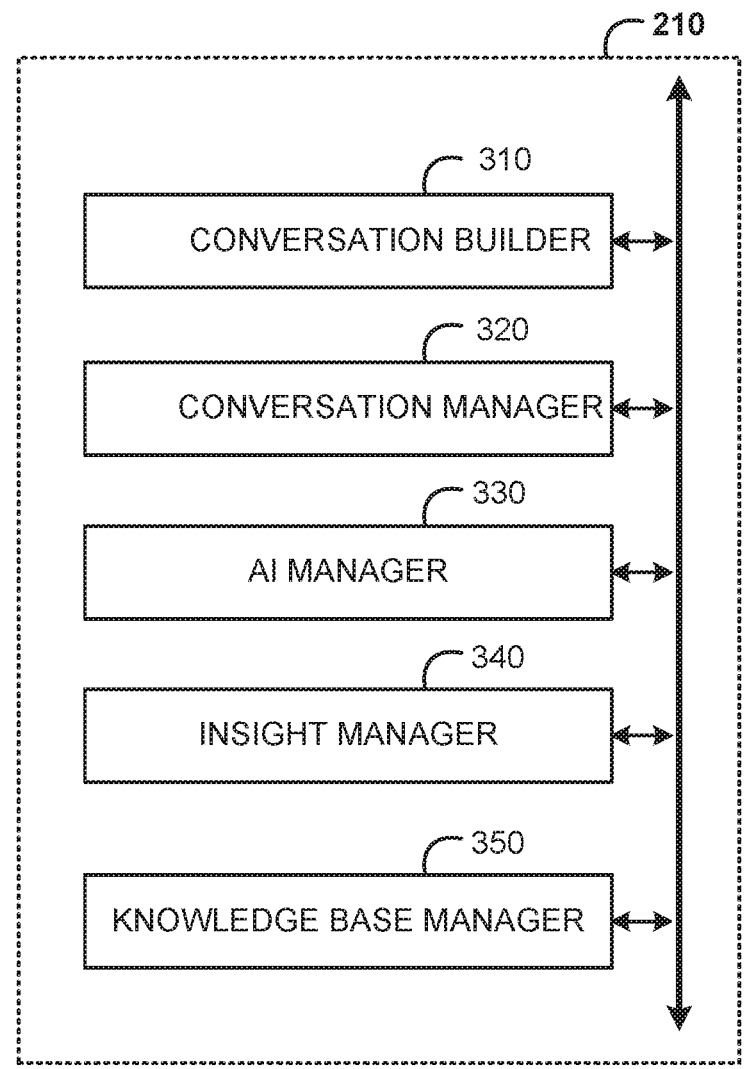
FIG. 3 is an example logical diagram of a user interface within the dynamic messaging server, in accordance with some embodiment.

FIG. 3 provides a more detailed illustration of the user interface 210. The user interface 210 includes a series of modules to enable the previously mentioned functions to be carried out in the message generator 220 and the message response system 230. These modules include a campaign builder 310, a campaign manager 320 an AI manager 330, an insight manager 340, and a knowledge base manager 350.

The campaign builder 310 allows the user to define a campaign, and input message templates for each series within the campaign. A knowledge set and lead data may be associated with the campaign to allow the system to automatically effectuate the campaign once built. Lead data includes all the information collected on the intended recipients, and the knowledge set includes a database from which the AI can infer context and perform classifications on the responses received from the recipients.

The campaign manager 320 provides activity information, status, and logs of the campaign once it has been implemented. This allows the user 102*a* to keep track of the campaign's progress, success and allows the user to manually intercede if required. The campaign may likewise be edited or otherwise altered using the campaign manager 320.

The AI manager 330 allows the user to access the training of the artificial intelligence which analyzes responses received from a recipient. One purpose of the given systems and methods is to allow very high throughput of message exchanges with the recipient with relatively minimal user input. To perform this correctly, natural language processing by the AI is required, and the AI (or multiple AI models) must be correctly trained to make the appropriate inferences and classifications of the response message. The user may leverage the AI manager 330 to review documents the AI has processed and has made classifications for.

The insight manager 340 allows the user to manage insights. As previously discussed, insights are a collection of categories used to answer some question about a document. For example, a question for the document could include "is the lead looking to purchase a car in the next month?" Answering this question can have direct and significant importance to a car dealership. Certain categories that the AI system generates may be relevant toward the determination of this question. These categories are the 'insight' to the question, and may be edited or newly created via the insight manager 340.

In a similar manner, the knowledge base manager 350 enables the management of knowledge sets by the user. As discussed, a knowledge set is set of tokens with their associated category weights used by an aspect (AI algorithm) during classification. For example, a category may include "continue contact?", and associated knowledge set tokens could include statements such as "stop", "do no contact", "please respond" and the like.

Figure 4:
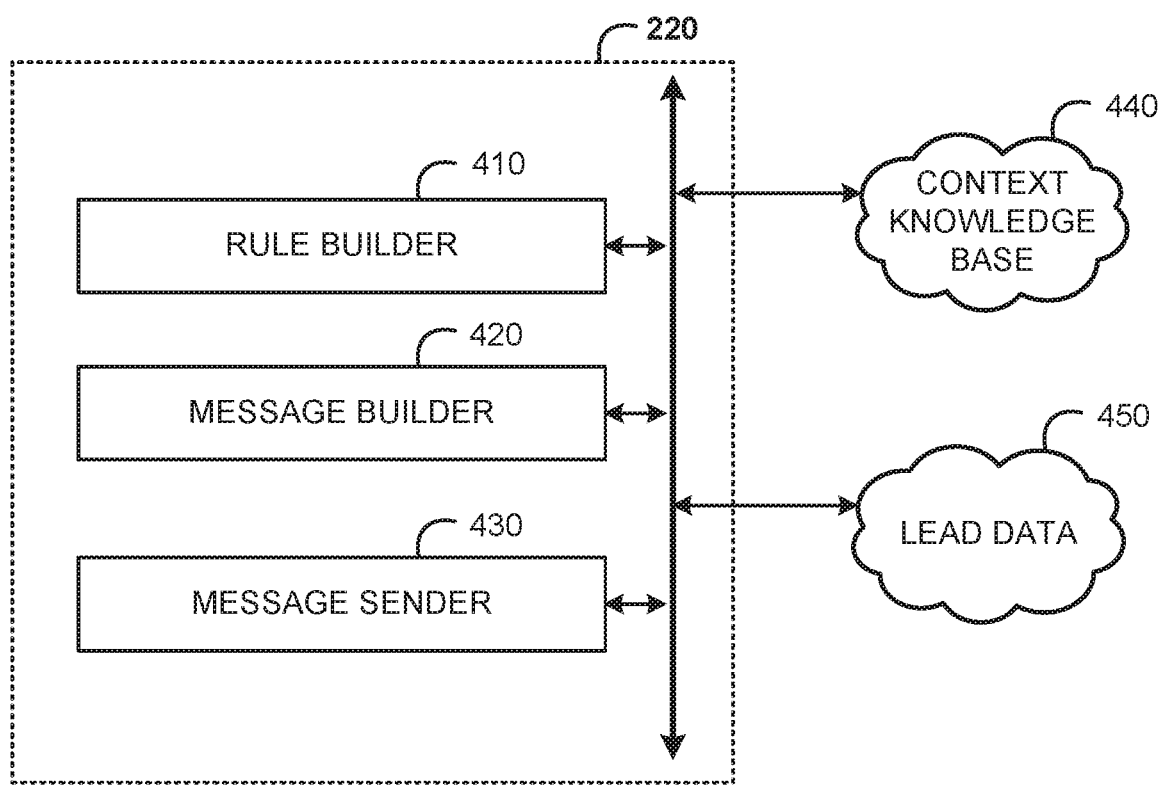
FIG. 4 is an example logical diagram of a message generator within the dynamic messaging server, in accordance with some embodiment.

Moving on to FIG. 4, an example logical diagram of the message generator 220 is provided. The message generator 220 utilizes context knowledge 440 and lead data 450 to generate the initial message. The message generator 220 includes a rule builder 410 which allows the user to define rules for the messages. A rule creation interface which allows users to define a variable to check in a situation and then alter the data in a specific way. For example, when receiving the scores from the AI, if the insight is Interpretation and the chosen category is 'good', then have the Continue Messaging insight return 'continue'.

The rule builder 410 may provide possible phrases for the message based upon available lead data. The message builder 420 incorporates those possible phrases into a message template, where variables are designated, to generate the outgoing message. This is provided to the message sender 430 which formats the outgoing message and provides it to the messaging platforms for delivery to the appropriate recipient.

Figure 5A:
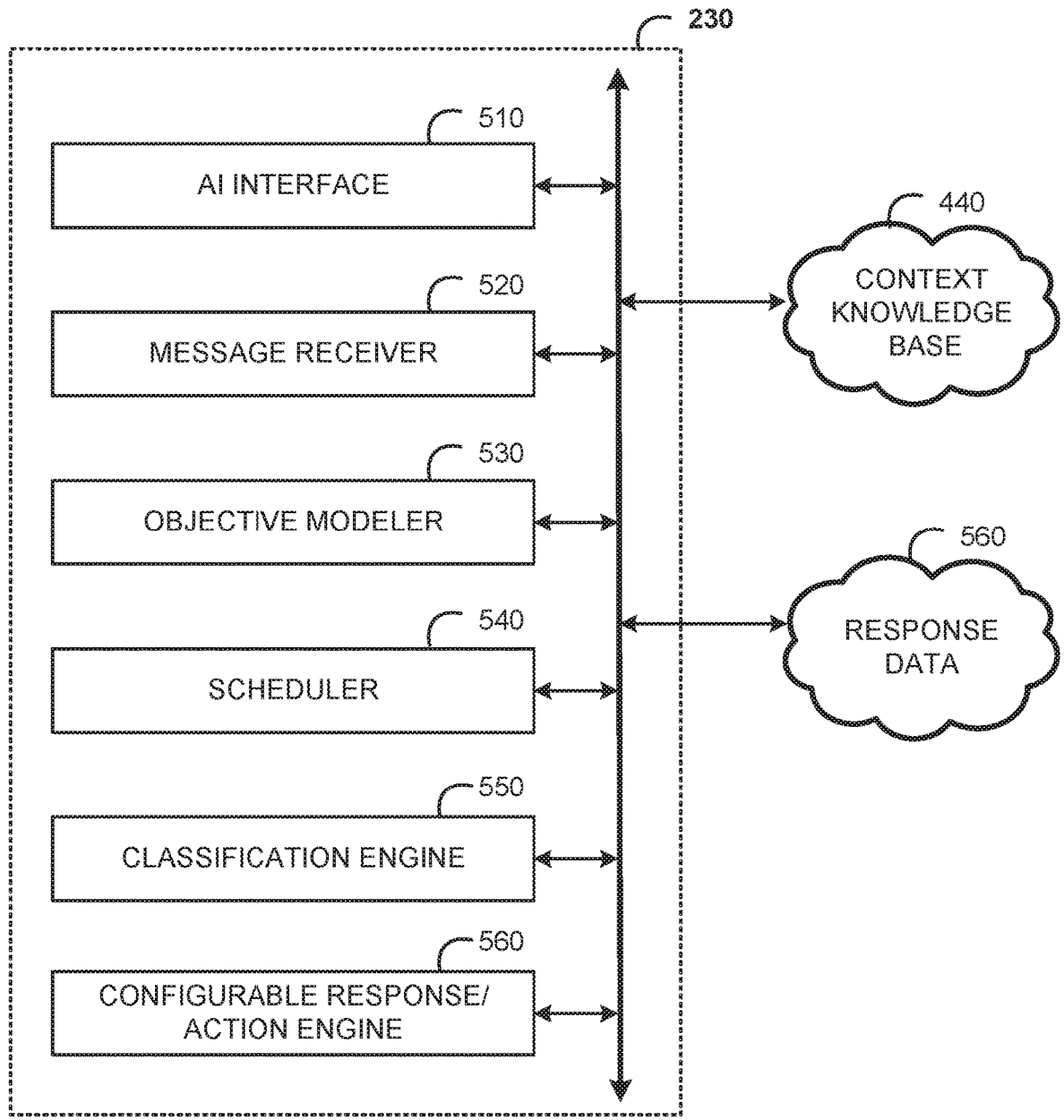
FIG. 5A is an example logical diagram of a message response system within the dynamic messaging server, in accordance with some embodiment.

FIG. 5A is an example logical diagram of the message response system 230. In this example system, the contextual knowledge base 440 is utilized in combination with response data 560 received from the lead. The message receiver 520 receives the response data 560 and provides it to the AI interface 510, objective modeler 530, and classifier engine 550 for feedback. The AI interface 510 allows the AI platform (or multiple AI models) to process the response for context, insights, sentiments and associated confidence scores. The classification engine 550 includes a suite of tools that enable better classification of the messages. Based on the classifications generated by the AI and classification engine 550 tools lead objectives may be updated by the objective modeler 530. The objective modeler may indicate what the objective to the next action in the campaign may entail, while a configurable response/action engine 560 may generate a response or other action which meets the objective.

The response/action engine 560 can determine whether there are further objectives that are still pending, or whether there has been a request to discontinue messaging the lead. If there has been a termination request, or if all objectives have been fulfilled, the message receiver may deactivate the campaign for the given lead. If not, a scheduler 540 may be employed to assist in scheduling the next step of the campaign, as indicated by the response/action engine 560.

Figure 5B:
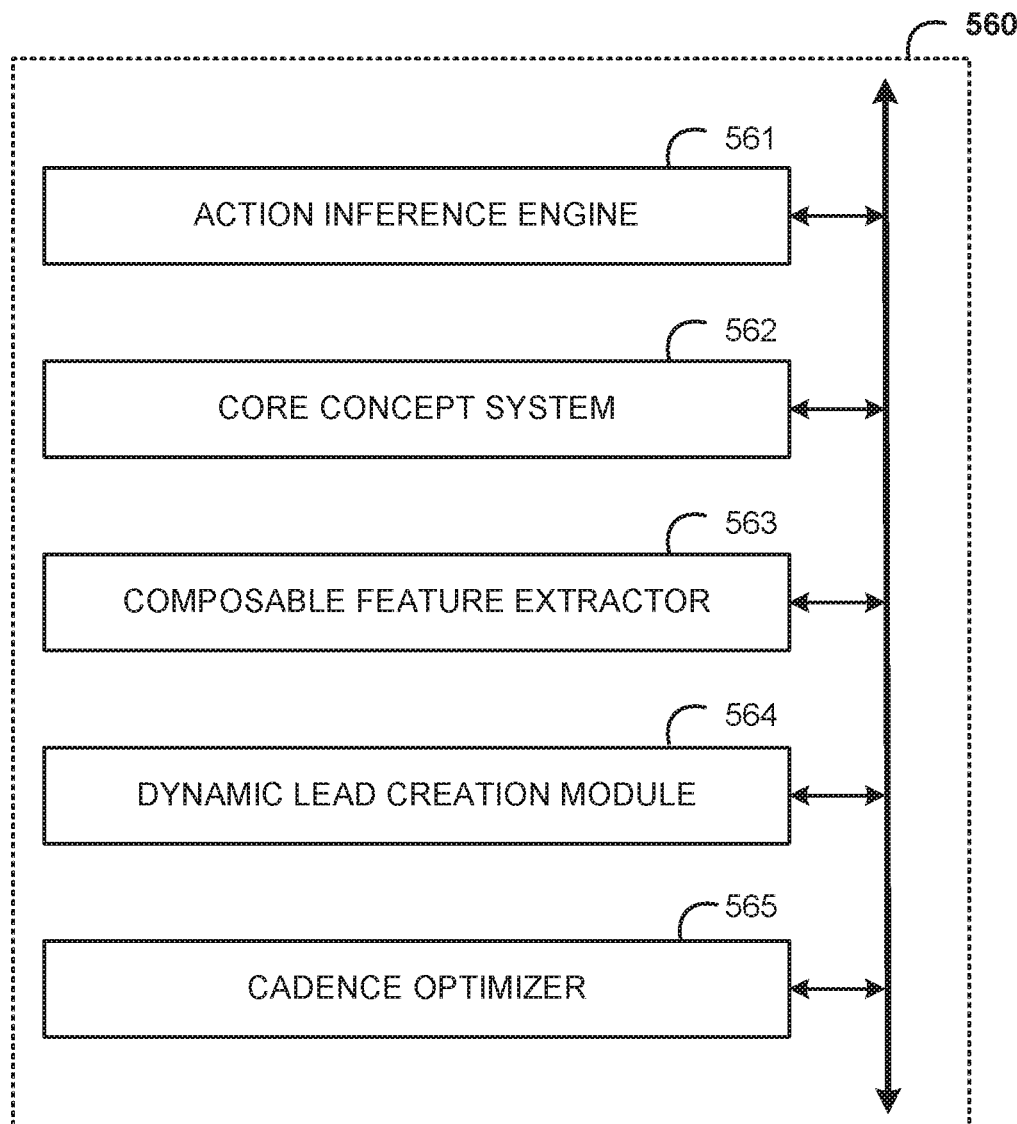
FIG. 5B is an example logical diagram of a configurable response-action engine within the message response system, in accordance with some embodiment.

Turning to FIG. 5B, the response/action engine 560 is illustrated in greater detail. This component of the message response system may include an action inference engine 561. The action inference engine 561 is an independent AI component, comprised of a machine learned model, used to drive the action response to insights that are garnered from the classification models. This independent model uses additional information, such as the industry the campaign is operating in, segment, client specific instructions and parameters, third party data and lead information. These additional factors may be consumed by the model to generate many different behaviors/response actions for different customers, even when the objective is the same for each customer.

For example, assume the objective is to schedule a time for the lead to speak with a company representative. Also assume the lead in the previous message sends an email stating "I am not interested." This message, when processed through the natural language processing and classification, will result in an insight of "discontinue contact". However, some clients of the messaging system may wish to continue messaging (a "hard sales tactic") even after an initial discontinuation request is received. Another client may have a requirement to have a much lower pressure approach. These two clients' campaigns have the same objective, and same insight, but will generate entirely different responses: one seeking another attempt to set up a call, the other to discontinue calling.

Likewise, assume the lead has a profile, and that the system is aware the lead has previously changed opinions after stating they are not interested. Absent this lead information, a request to discontinue the messaging could result in a termination of contact, whereas in this situation the system may continue messaging despite the request since the lead is known to change opinions.

Further instructions by a client could indicate how aggressive the language used in the messaging is, order in which information is garnered, length of time before sending reminder messages and the like. Likewise, lead information may include profiles that indicate what line of convincing the lead is most easily influenced by, lead response times, etc. For example, a lead may be known to be very logical and prompt in response. Messages to this lead may thus be generated to appeal to the lead's logic, and if a response is not received from the lead in a few days, a follow-up message may be sent. Whereas a less prompt lead may have the follow-up message delayed a week in order to avoid annoying the lead with too much correspondence.

Other factors used by the independent AI model include industry, segment, and additional third party data. For example, in the banking and financial industry a number of holidays are celebrated that standard businesses may not observe. In these industries, the responses may be delayed or accelerated to avoid these less common holidays. Likewise, some segments may employ the usage of certain agreement types, acronym usage, or etiquette conventions not typically shared. For example, some segments may operate where initial meetings are typically made over a working lunch, instead of by phone or in a more formal office setting. For these segments, the action inference engine 561 may suggest a location and time to accommodate this type of lunch meeting if the objective is to set up a meeting between the lead and a client representative. In another segment however, for the exact same objective, the system may instead propose a skype meeting, telephone call, in face office meeting, etc. all dependent upon multiple factors such as lead information and client preferences.

In some embodiments, the action responses may vary dependent upon the role of the lead. For example, someone identifying as a student may be treated differently as compared to a full-time employee (student gets directed to a website, employee gets a call from sales rep). Likewise, in some examples someone with the title of administrative assistant would be treated differently than a C-level executive title.

Additionally, different actions may be generated based on the client systems the system is integrate with. For example, if integrated with Salesforce, the action response may take additional action of updating "Do Not Contact" field in Salesforce if a request to not email (or text) is received.

Further, different actions may be undertaken based on client communication preferences. For example, a lead may respond with "contact me by phone or text". One client may prefer to contact by phone first, another by text and another may want to do both. The actions taken may be directed by a modifiable client preference file for such decisions.

Of note, a critical importance is that the action inference engine 561 is an independent model from the classification models. A response analysis by the classification models should generate standard insights regarding the message received from the lead. The classification model looks for objective truths in the message received, and provides these truths (insights) to the action inference engine 561 for formulating the response. It is in the decision making of the response where other factors such as the lead's disposition, campaign owner's preferences, and other rules and requirements come into play. In this manner the insights are not "hard wired" to result in a given action in a rule based manner (as current systems employ), but rather enables flexibility in response that is most appropriate to the situation.

The independence of the models also enables improved and alternate training of the respective models. Machine learned AI models relay upon human training to teach them the "correct" output in response to a given input. The classification model receives a document from a lead and outputs one or more insights related to the document. This model is trained by annotating the incoming documents with feedback from a human relating to proper insights for the given document. The human providing these annotation is domain agnostic; administrators to the campaign manager system may supply these annotations. In contrast the inference engine 561 produces action outputs in response to an insight and objective. These outputs require annotations by domain specific trainers. Thus, the individuals providing annotations should be from the client (the party for which the messaging campaign is being generated). This difference who is providing the training of the models is also an important factor in the independence of the models.

The configurable response/action engine 560 may also include a core concept system 562. This core concept system 562 includes a database that includes a set of idealized and basic concepts. These concepts are formulated in the most generic form possible. Any statement made may be reduced to one or more of these basic core concepts. For example if a statement is "I ate pie", the core concepts may include "me eat FOOD". Another example is for the statement "My email is . . . " the core concepts would be defined as "me email be EMAIL . . . "

The usage of core concepts allows for the simplest and clearest way to communicate an idea or concept. Regular language employed typically includes many hundreds or thousands of variations to convey any given core concept. For example, in relation to the above example, the same core concept may apply to "I love pie", "pie is yummy", "pie tastes good", "Pie is the perfect food" etc. Human generated conversations may be processed by the core concept system 562 to render down an entire corpus into the core concepts using the NLP systems already discussed. The results of such an analysis may include a distribution of what the persons involved are speaking about, and a catalog of all concepts discussed. Further, the system may map these core concepts to the insights utilized by the response engine. This benefits the system by decreasing noise by grouping like-concepts. For example, if the system may add the concept PHONE whenever there is a phone number, and the concept EMAIL whenever there is an email, this enables grouping of messages by whether there is a mention of a phone number or email. As various layers of feature extraction are performed, features can become increasingly abstract. For example, PHONE and EMAIL could be abstracted to COMMUNICATION_MEDIUM.

Returning to FIG. 5B, the configurable response/action engine 560 may also include a composable feature extractor 563. The composable feature extractor 563 enables the implementation of classifiers and normalization steps to messages dynamically, by identifying common normalization steps between different system configurations, and select out messages that are appropriate, and with appropriate classifiers, to normalize in batch rather than individually. Batch normalization enables the system to save time during this process.

Features can be extracted on both client and conversation based configurations using this batch normalization process. This supports the discovery of insights in both client and conversation based configurations.

The configurable response/action engine 560 may also include a dynamic lead creation module 564. The dynamic lead creation module 564 functions to automatically generate new leads in response to specific events, such as referrals contained in a response. The dynamic lead creation module 564 identifies that the new actor is distinct from the original, and ensures that new criteria, profile information, salutations, etc. are used with the new actor.

Further, the configurable response/action engine 560 may also include a cadence optimizer 565. The cadence optimizer 565 may perform testing to vary message send times. Results from these messaging tests can be compiled along with information related to the message objectives, industry involved, segments, and actor profiles. The successful resolution of the objectives, response rates, and sentiments can be tracked as well. Patterns relating to message timing in light of these various features can then be extracted. In subsequent messaging, the timing a message is sent can be varied accordingly to help maximize the likelihood that the given objective is accomplished.

For example, in the context of purchasing supplies within a commodity market, the system may vary messaging and determine the last week before quarter ending results in the greatest traction in meeting the objective. The system may also determine that for a particular actor, they are more susceptible to responding if the message is provided on a Tuesday mid-morning. Using these pieces of information, for this particular example the messaging going forward would be sent on mid-morning on the Tuesday before quarter end. Conversely, other industries may operate differently, and have other periods of time when messaging is most effective. For example, in operations where monthly targets or batch activities occur, such as real estate title insurance, the end of the month is particularly busy. In such industry segments, the system may learn through the testing that people respond best in the first half of the month. In this manner, the cadence optimizer 565 may dynamically react to any number of factors-ranging from industry wide trends to individual actor preferences- to ensure that messages are sent at the most opportune time.

III. Methods

Figure 6:
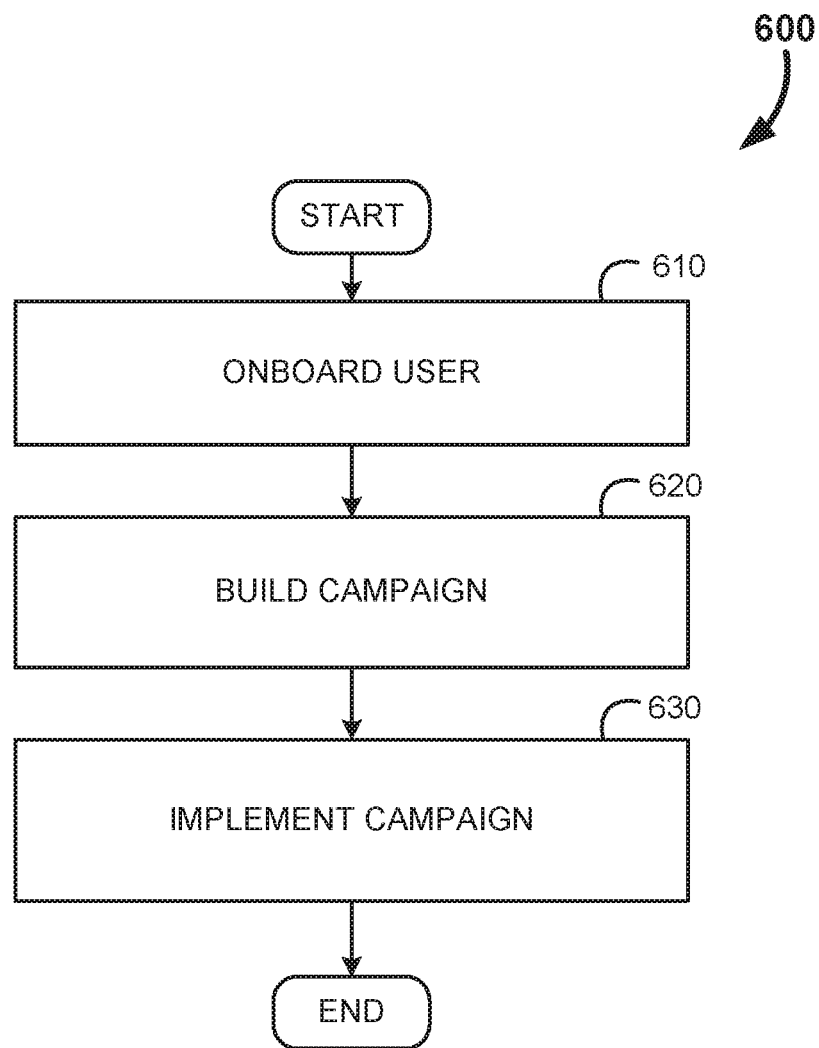
FIG. 6 is an example flow diagram for a dynamic message campaign, in accordance with some embodiment.

Now that the systems for dynamic messaging have been broadly described, attention will be turned to processes employed to generate and present responses or other actions within the messaging campaign. In FIG. 6 an example flow diagram for a dynamic message campaign is provided, shown generally at 600. The process can be broadly broken down into three portions: the on-boarding of a user (at 610), campaign generation (at 620) and campaign implementation (at 630). The following figures and associated disclosure will delve deeper into the specifics of these given process steps.

Figure 7:
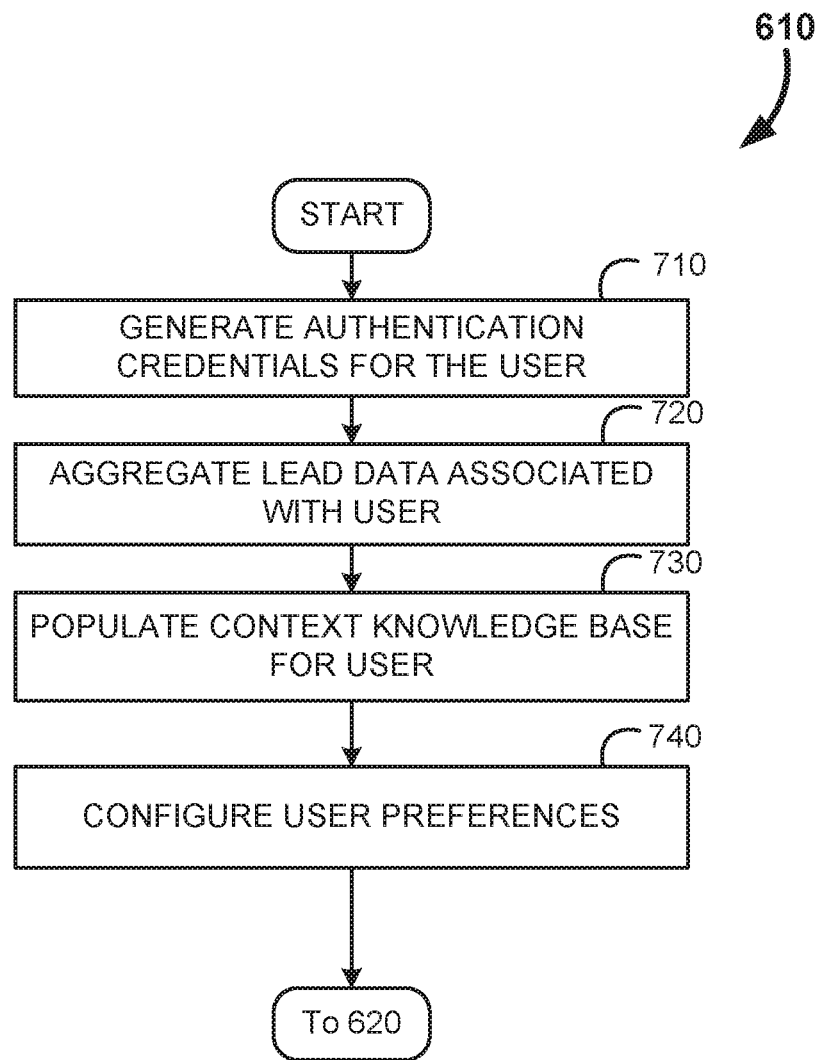
FIG. 7 is an example flow diagram for the process of on-boarding a business actor, in accordance with some embodiment.

FIG. 7, for example, provides a more detailed look into the on-boarding process, shown generally at 610. Initially a user is provided (or generates) a set of authentication credentials (at 710). This enables subsequent authentication of the user by any known methods of authentication. This may include username and password combinations, biometric identification, device credentials, etc.

Next, the lead data associated with the user is imported, or otherwise aggregated, to provide the system with a lead database for message generation (at 720). Likewise, context knowledge data may be populated as it pertains to the user (at 730). Often there are general knowledge data sets that can be automatically associated with a new user; however, it is sometimes desirable to have knowledge sets that are unique to the user's campaign that wouldn't be commonly applied. These more specialized knowledge sets may be imported or added by the user directly.

Lastly, the user is able to configure their preferences and settings (at 740). This may be as simple as selecting dashboard layouts, to configuring confidence thresholds required before alerting the user for manual intervention.

Figure 8:
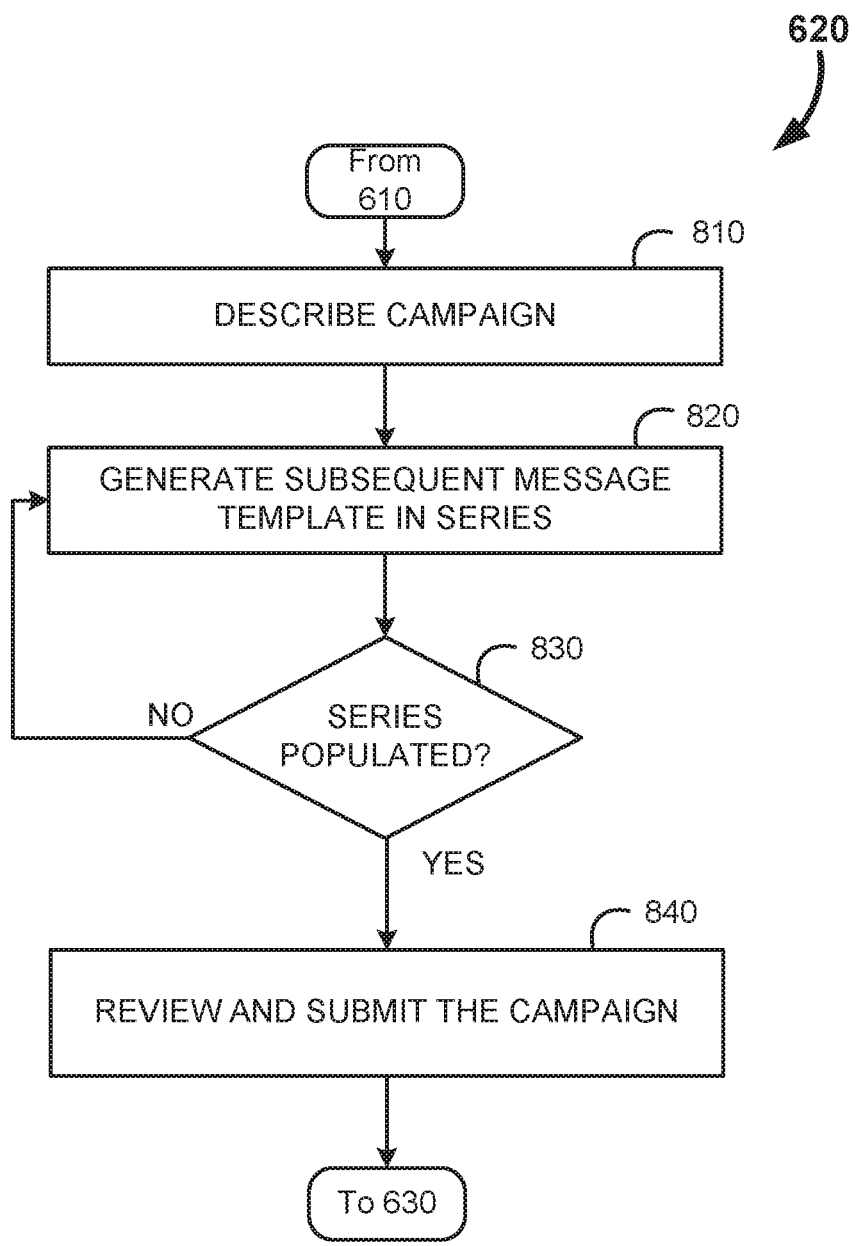
FIG. 8 is an example flow diagram for the process of building a business activity such as campaign, in accordance with some embodiment.

Moving on, FIG. 8 is the example flow diagram for the process of building a campaign, shown generally at 620. The user initiates the new campaign by first describing the campaign (at 810). Campaign description includes providing a campaign name, description, industry selection, and service type. The industry selection and service type may be utilized to ensure the proper knowledge sets are relied upon for the analysis of responses.

Figure 9:
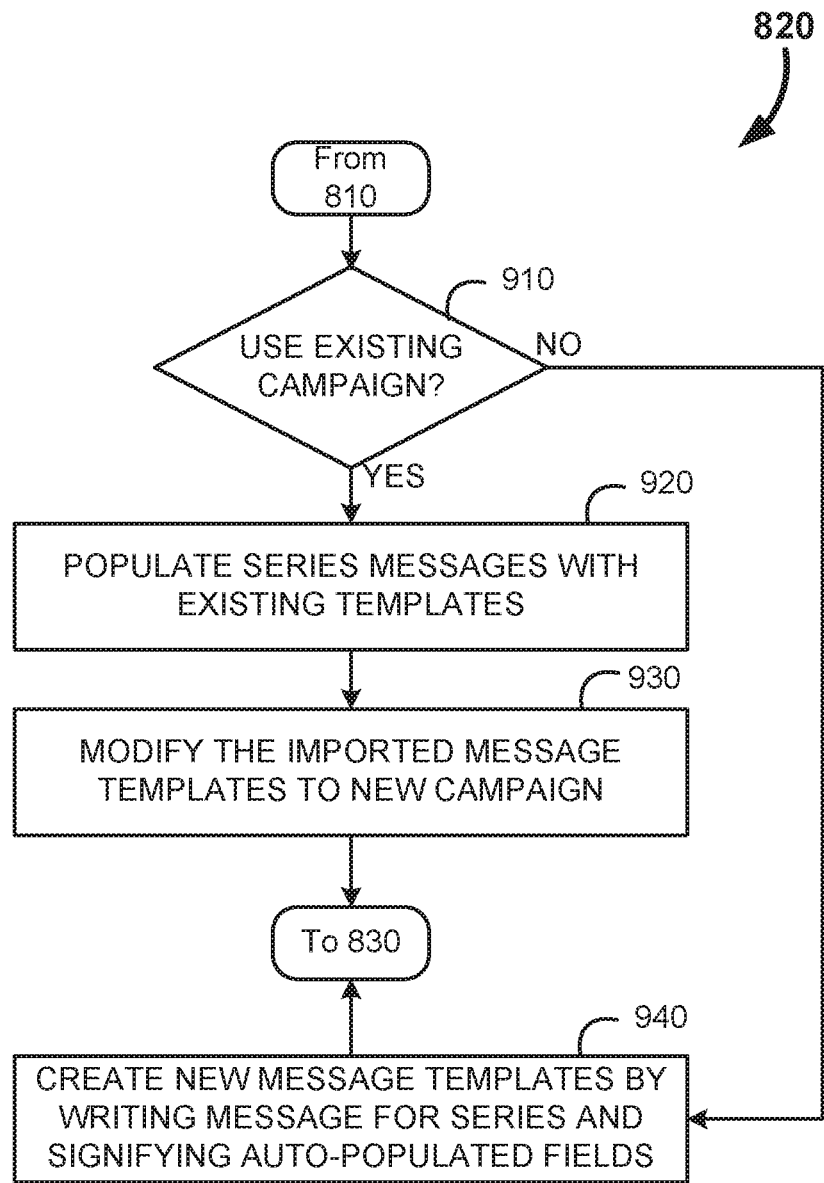
FIG. 9 is an example flow diagram for the process of generating message templates, in accordance with some embodiment.

After the campaign is described, the message templates in the campaign are generated (at 820). If the series is populated (at 830), then the campaign is reviewed and submitted (at 840). Otherwise, the next message in the template is generated (at 820). FIG. 9 provides greater details of an example of this sub-process for generating message templates. Initially the user is queried if an existing campaign can be leveraged for templates, or whether a new template is desired (at 910).

If an existing campaign is used, the new message templates are generated by populating the templates with existing templates (at 920). The user is then afforded the opportunity to modify the message templates to better reflect the new campaign (at 930). Since the objectives of many campaigns may be similar, the user will tend to generate a library of campaign that may be reused, with or without modification, in some situations. Reusing campaigns has time saving advantages, when it is possible.

However, if there is no suitable conversation to be leveraged, the user may opt to write the message templates from scratch using the Conversation Editor (at 940). When a message template is generated, the bulk of the message is written by the user, and variables are imported for regions of the message that will vary based upon the lead data. Successful messages are designed to elicit responses that are readily classified. Higher classification accuracy enables the system to operate longer without user interference, which increases campaign efficiency and user workload.

Figure 10:
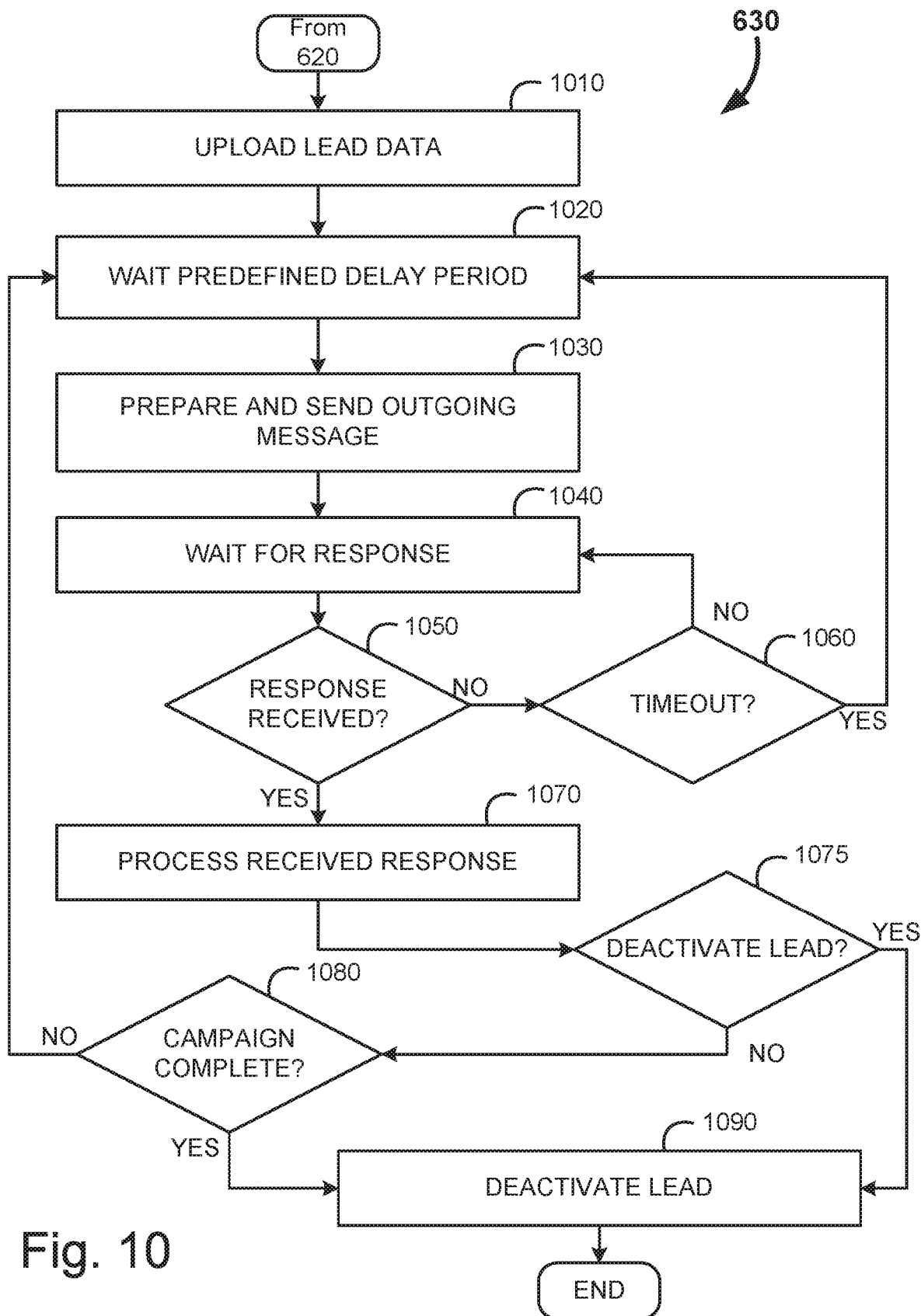
FIG. 10 is an example flow diagram for the process of implementing the campaign, in accordance with some embodiment.

Once the campaign has been built out it is ready for implementation. FIG. 10 is an example flow diagram for the process of implementing the campaign, shown generally at 630. Here the lead data is uploaded (at 1010). Lead data may include any number of data types, but commonly includes lead names, contact information, date of contact, item the lead was interested in, etc. Other data can include open comments that leads supplied to the lead provider, any items the lead may have to trade in, and the date the lead came into the lead provider's system. Often lead data is specific to the industry, and individual users may have unique data that may be employed.

An appropriate delay period is allowed to elapse (at 1020) before the message is prepared and sent out (at 1030). The waiting period is important so that the lead does not feel overly pressured, nor the user appears overly eager. Additionally, this delay more accurately mimics a human correspondence (rather than an instantaneous automated message).

Additionally, as the system progresses and learns, the delay period may be optimized by the cadence optimizer to be ideally suited for the given message, objective, industry involved, and actor receiving the message. This cadence optimization is described in greater detail later in this disclosure.

Figure 11:
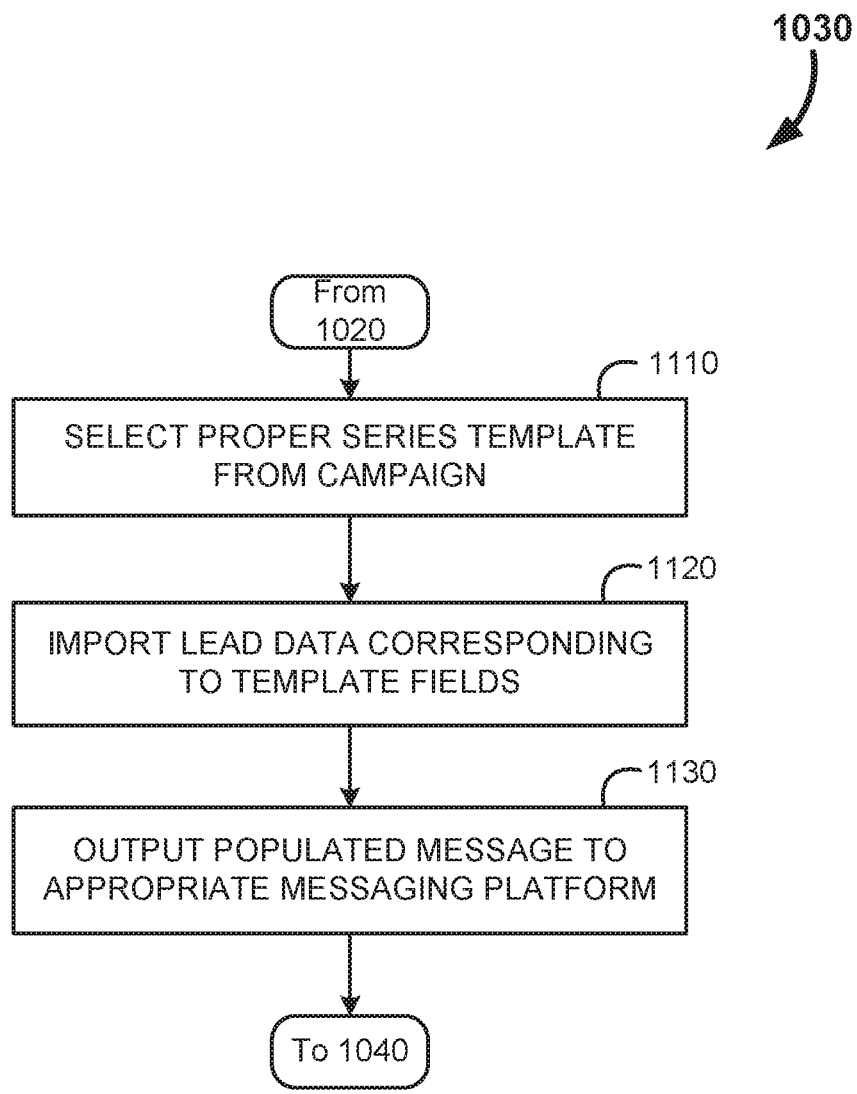
FIG. 11 is an example flow diagram for the process of preparing and sending the outgoing message, in accordance with some embodiment.

FIG. 11 provides a more detailed example of the message preparation and output. In this example flow diagram, the message within the series is selected based upon which objectives are outstanding (at 1110). Typically, the messages will be presented in a set order; however, if the objective for a particular lead has already been met for a given series, then another message may be more appropriate. Likewise, if the recipient didn't respond as expected, or not at all, it may be desirous to have alternate message templates to address the lead most effectively.

After the message template is selected from the series, the lead data is parsed through, and matches for the variable fields in the message templates are populated (at 1120). The populated message is output to the appropriate messaging platform (at 1130), which as previously discussed typically includes an email service, but may also include SMS services, instant messages, social networks, or the like.

Returning to FIG. 10, after the message has been output, the process waits for a response (at 1040). If a response is not received (at 1050) the process determines if the wait has been timed out (at 1060). Allowing a lead to languish too long may result in missed opportunities; however, pestering the lead to frequently may have an adverse impact on the relationship. As such, this timeout period may be user defined. Often the timeout period varies from a few days to a week or more. If there has not been a timeout event, then the system continues to wait for a response (at 1050). However, once sufficient time has passed without a response, it may be desirous to return to the delay period (at 1020) and send a follow-up message (at 1030). Often there will be available reminder templates designed for just such a circumstance.

Figure 12:
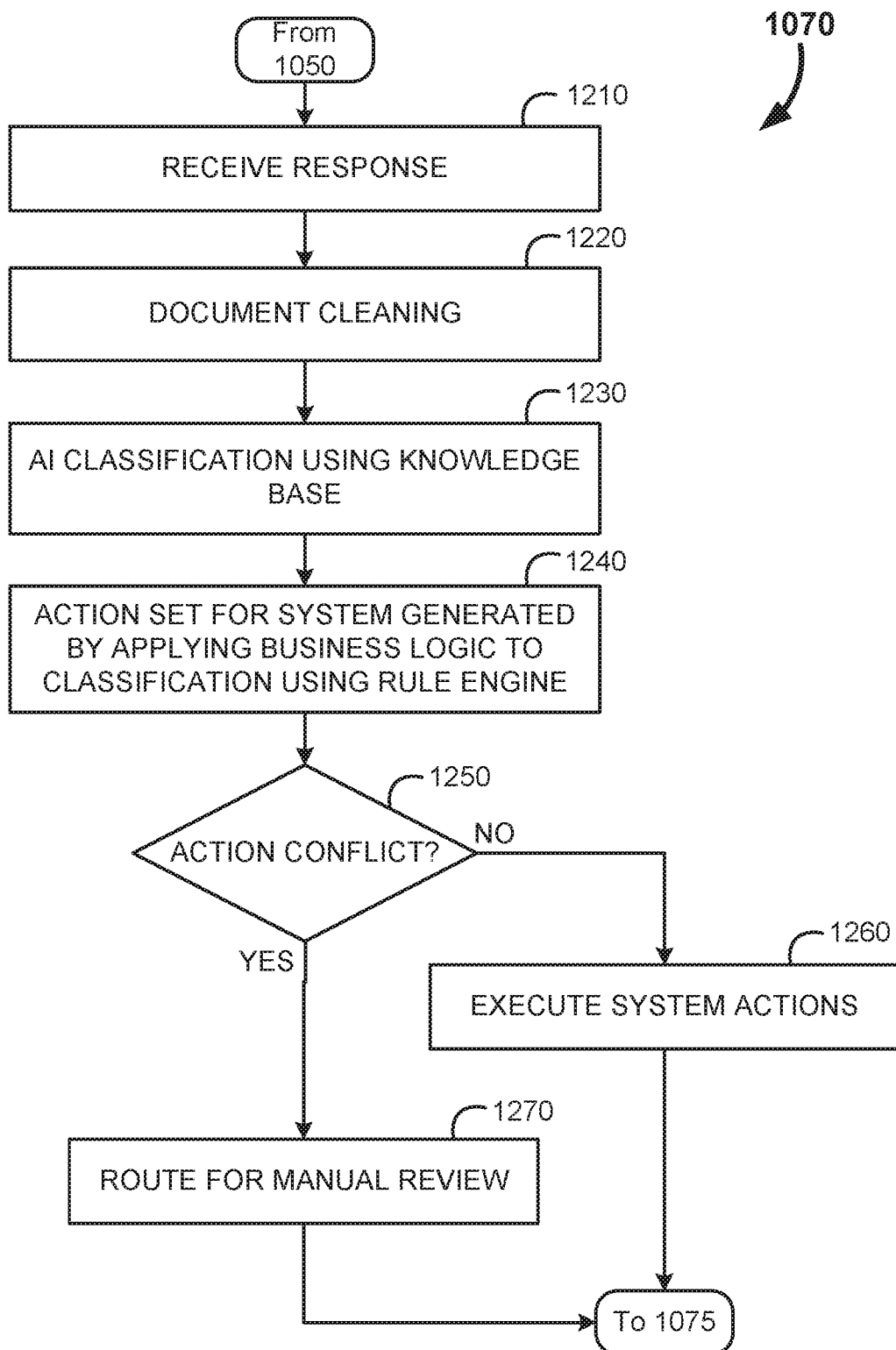
FIG. 12 is an example flow diagram for the process of processing received responses, in accordance with some embodiment.

However, if a response is received, the process may continue with the response being processed (at 1070). This processing of the response is described in further detail in relation to FIG. 12. In this sub-process, the response is initially received (at 1210) and the document may be cleaned (at 1220).

Figure 13:
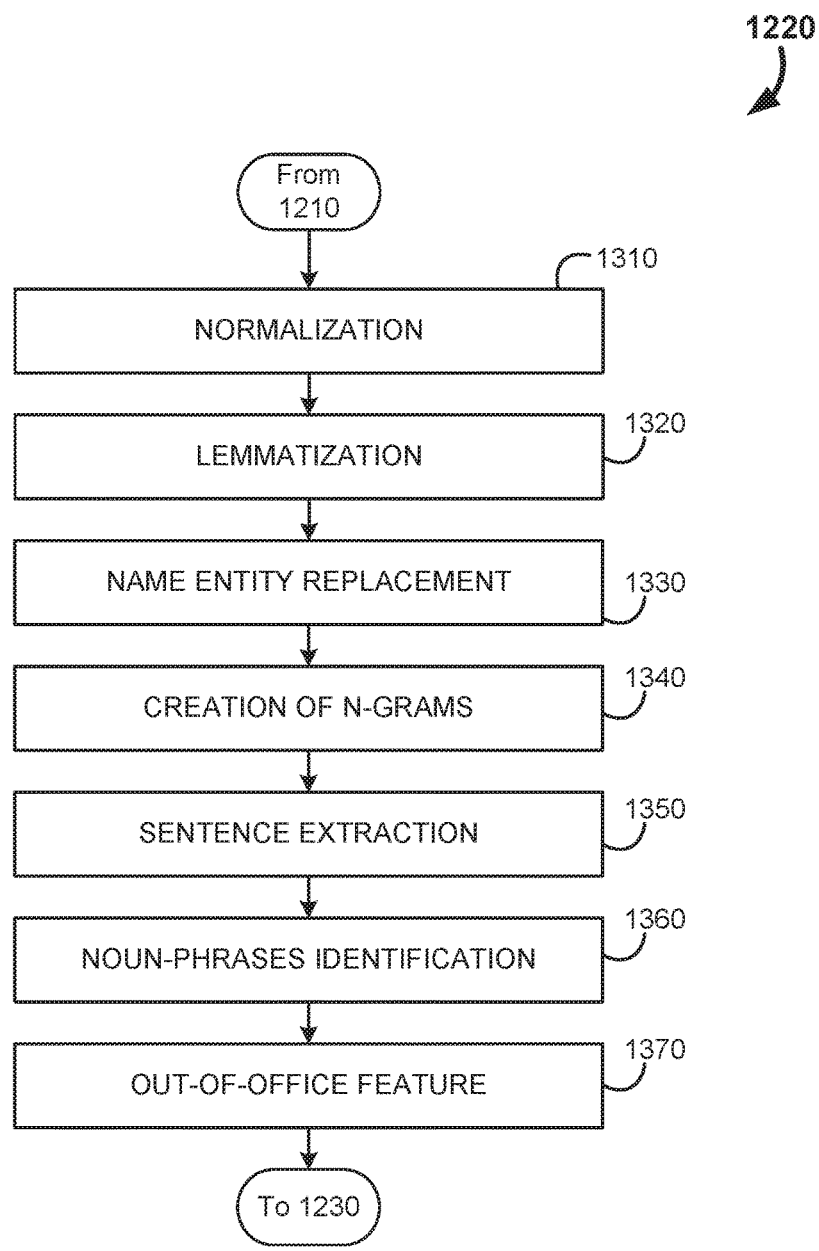
FIG. 13 is an example flow diagram for the process of document cleaning, in accordance with some embodiment.

Document cleaning is described in greater detail in relation with FIG. 13. Upon document receipt, adapters may be utilized to extract information from the document for shepherding through the cleaning and classification pipelines. For example, for an email, adapters may exist for the subject and body of the response, often a number of elements need to be removed, including the original message, HTML encoding for HTML style responses, enforce UTF-8 encoding so as to get diacritics and other notation from other languages, and signatures so as to not confuse the AI. Only after all this removal process does the normalization process occur (at 1310) where characters and tokens are removed in order to reduce the complexity of the document without changing the intended classification.

Figure 14:
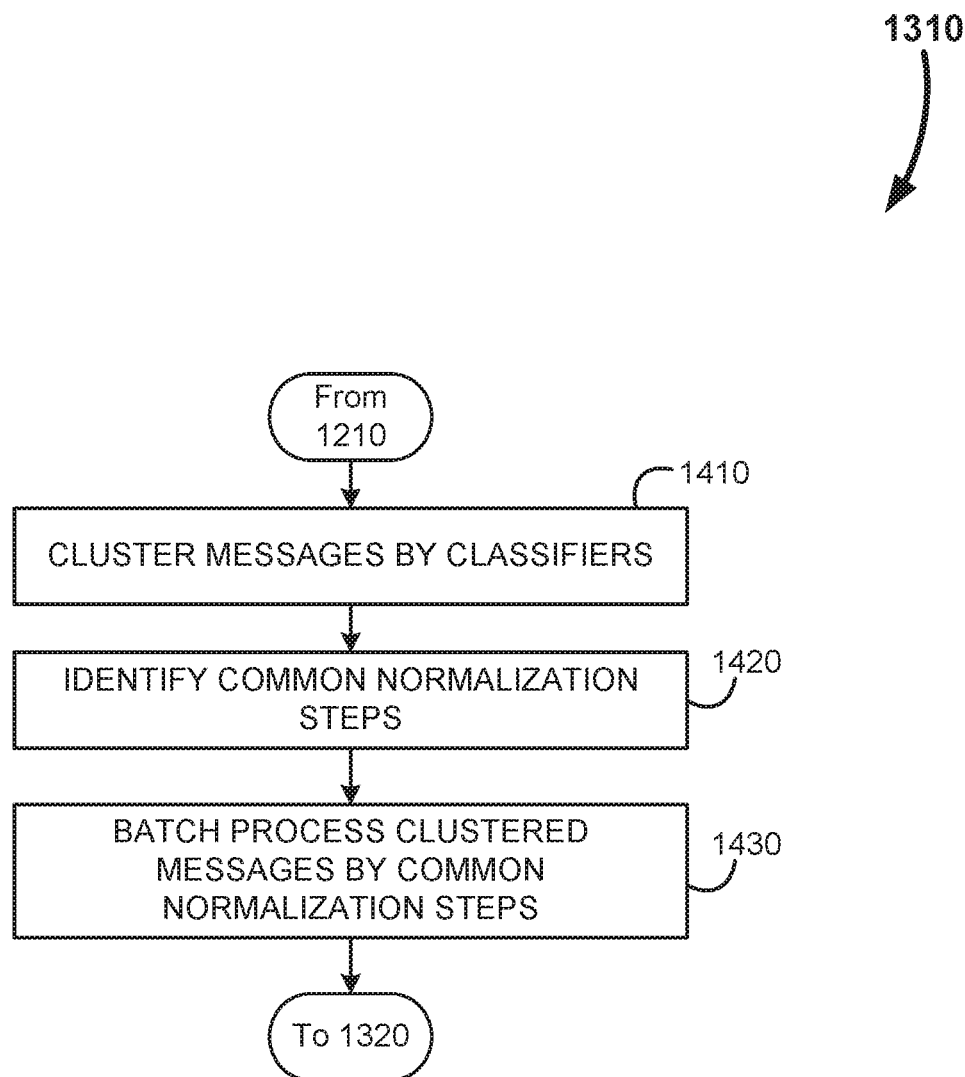
FIG. 14 is an example flow diagram for the process of normalization, in accordance with some embodiment.

Normalization is discussed in even greater detail in relation with FIG. 14. The messages are clustered (at 1410) by conversation, client, industry, conversation state (second message in a chain, previous response was "prefers SMS", etc.), language, and medium (email/text/chat), among others. Common normalization steps are identified for each cluster (at 1420). These clusters are independent of message configuration, so conversation specific configurations may be clustered along with client specific configurations.

Once the messages are appropriately grouped, and the common normalization steps identified, then the groupings may be subjected to batch normalization (at 1430). Batch normalization enables reductions in processing demands and decreased processing time. In some embodiments, this normalization step includes variabilization, removing stopwords, manual replacements, spelling corrections, and removal of punctuation, numbers, and any other tokens that are deemed unnecessary. Appendix A provides an example listing of a set of possible message normalizations, including polarity and taxonomy. Normalization can be hierarchical, with very simple normalizations (normalizing all verb tenses to a stem; eat ate eaten→"eat") feeding into higher-level normalizations (eat drink imbibe→"consume"). Also, normalization is generally additive; the system will never remove information, only add it. As such, the word "eaten" would not be replaced, but rather, "eat" is added to the words in the message.

Returning to FIG. 13, after the normalization, documents are further processed through lemmatization (at 1320), name entity replacement (at 1330), the creation of n-grams (at 1340) sentence extraction (at 1350), noun-phrase identification (at 1360) and extraction of out-of-office features and/or other named entity recognition (at 1370). Each of these steps may be considered a feature extraction of the document. Historically, extractions have been combined in various ways, which results in an exponential increase in combinations as more features are desired. In response, the present method performs each feature extraction in discrete steps (on an atomic level) and the extractions can be "chained" as desired to extract a specific feature set.

The operations used in these steps are referred to as 'transformations' and include text-to-text transforms and text-to-feature transforms. A text-to-text transform takes a text string input and generates a text string output. The normalization, lemmatization and name entity replacement are all examples of a text-to-text transform. As noted before, normalization includes removing particular elements, such as non-alphanumeric characters, and placing the words of the document into standard formats. Normalization steps may be domain dependent. Lemmatization is the removal of inflection endings to return the base of the term. This may also be referred to as 'stemming'. Name entity replacement is the process of replacing a name, such as 'Ryan' with an entity type, in this example "PERSON". Another example would be the replacement of the name "Microsoft" with the entity "COMPANY".

Text-to-Feature transformations take a text string input and produce a set of features as an output. Sentence extraction, n-gram generation, noun-phrase identification and out-of-office features are all examples of text-to-feature transformations. Sentence extraction is the process of removing discrete sentences from the document. N-gram generation is clustering the words (grams) of the sentence into groups. For example a 1-gram of the sentence "I like pie" would return [I], [like], [pie]. Whereas a 2-gram of this sentence would return [I, like], and [like, pie]. An example of noun-phrase identification is "the green house was built on the big hill" could be transformed to "NOUN-PHRASE is on NOUN-PHRASE". This could be useful if the system is concerned with a specific action on any noun-phrase pairing (such as out of office noun-phrases).

In some cases the text-to-feature extractions may include additional steps such as annotating the feature with factual data from the source document. This annotation may be helpful in providing information to a downstream human user, and to maintain information for later system reference. For example, in the name entity replacement, the system may receive an input of "Call me or Bill." The extraction may generate an output of "Call me or PERSON." The "fact" associated with the feature "PERSON" is the name "Bill". Other feature-fact pairings can include email addresses ("EMAIL": John@doe.com), dates ("FUTURE DATE": "2019-8-25"), etc. After classification, the interface engine may combine these annotated facts with the insights generated by the classification to generate "actions". Actions may include responses, shifting states in the conversation, forwarding on the conversation and associated information of relevance to a human user, or the like.

Of note, transformations made to a document are immutable changes, and in order to preserve original information each new document generated after a given transformation is saved as a distinct version of the document. Tracking versioning of the document as it passes through the various transformations allows different transformations to be chained together in various ways without redundant processing steps. For example, assume a document (version 0) is normalized, (version 1). The normalized document (version 1) may be subjected to lemmatization (version 1.1), or 3-gram extraction (version 1.2). It may also be desirable to then to perform a 2-gram extraction on the lemmatized document (version 1.1.1). It may also be desirable to lemmatize the 2-gram extracted document (version 1.2.1). Version 1.1.1 is not necessarily the same as version 1.2.1 despite having the same transformations applied, due to the differing order of transformation application. By maintaining versions, it is possible to replicate exact feature sets through application of the correct order of transformations on a source document. This also allows revisions to the transformations using any suitable intermediary version, thereby reducing computational demands. Further, while we refer to steps as "normalization" or "lemmatization" these are broad classes of transforms. One variant of normalization may remove non-alphanumeric characters, whereas another variant of normalization may include domain specific removal and replacement of acronyms. Given the ballooning of transformations that can be applied, makes the versioning of particular importance.

Figure 15:
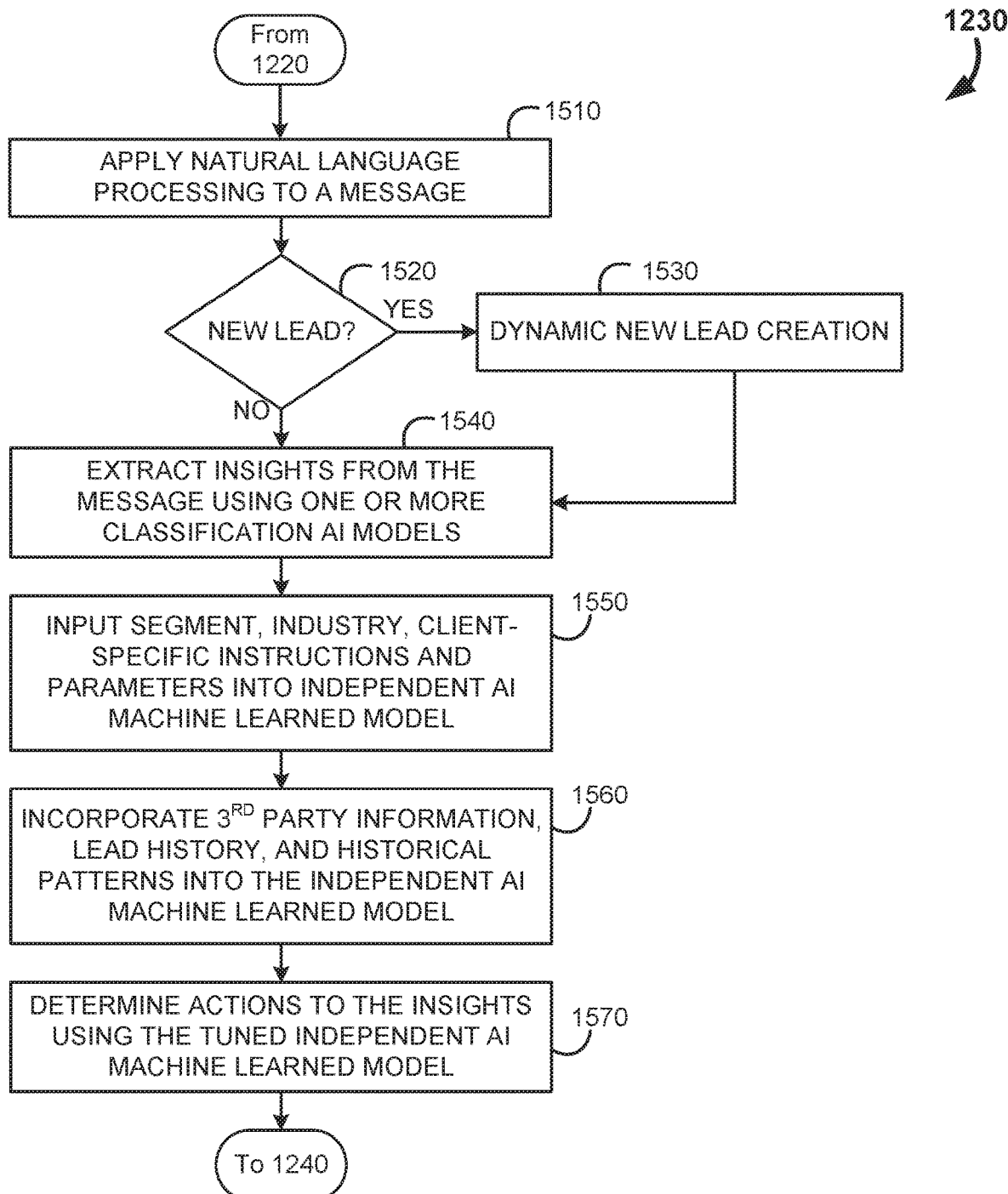
FIG. 15 is an example flow diagram for the process of document classification for the generation of a response, in accordance with some embodiment.

Returning to FIG. 12, after document cleaning, the transformed document is then provided to the AI platform for classification using the knowledge sets (at 1230). Classification is described in relation to FIG. 15 in considerably more detail. In this sub process the system initially applies natural language processing through one or more AI machine learning models to process the message (at 1510) for concepts contained within the message. As previously mentioned, there are a number of known algorithms that may be employed to categorize a given document, including Hardrule, Naïve Bayes, Sentiment, neural nets including convolutional neural networks and recurrent neural networks and variations, k-nearest neighbor, other vector based algorithms, etc. to name a few. In some embodiments, multiple algorithms may be employed simultaneously, and then a combination of the algorithm results are used to make the classification.

Figure 16:
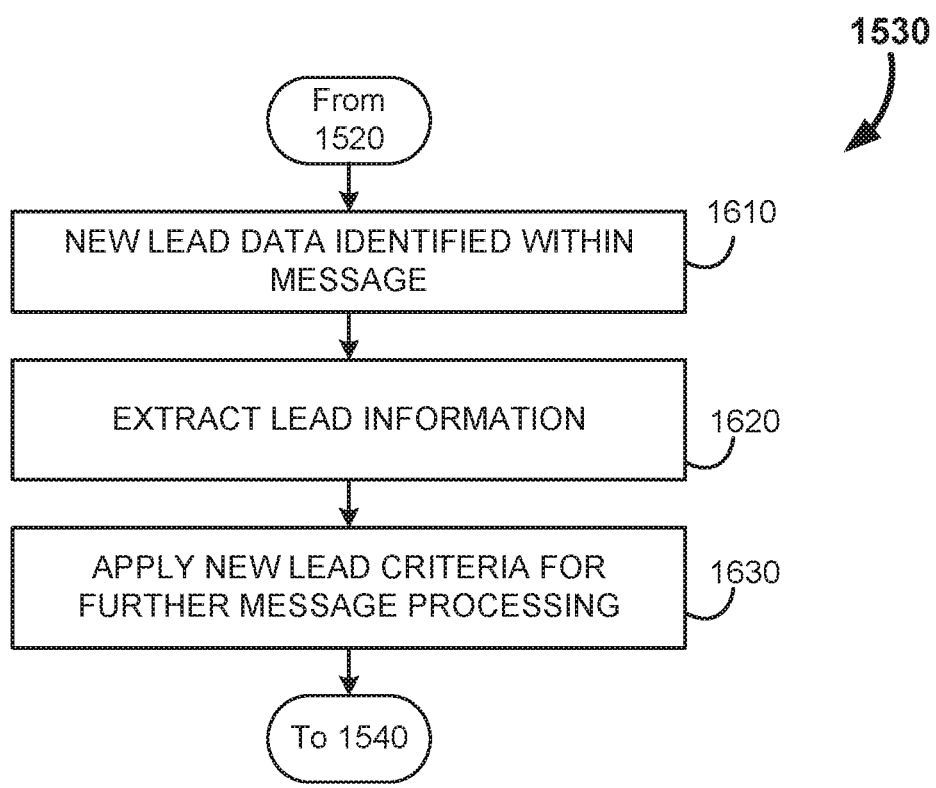
FIG. 16 is an example flow diagram for the process of dynamic new lead generation, in accordance with some embodiment.

One question that may be addressed during natural language processing includes whether a new lead is identified within the message (at 1520). When such a new lead is present, the system may undergo a dynamic lead creation process (at 1530) as seen in greater detail at FIG. 16. Lead creation initially starts with the identification of the new lead (at 1610). Leads are typically introduced in a message body, and new contact information may be embedded in the message as well, or may be present in an address line (in the case of an email or text string). This lead information may be extracted (at 1620) for which a new lead profile is generated. This new profile may be leveraged in all future correspondences with the new lead, including using a new set of criteria for messages processing (at 1630). This new lead information may be synced with whatever client system is used for storing lead information. The dynamic lead creation ensures that a conversation adaptively shifts in terms of approach and response processing once a new lead is involved. Since message processing may rely, at least on some part, upon models selected that historically operate best for a given lead, this ensures that the system continues to operate optimally in a single conversation, even when the lead conversing with the system changes.

Returning to FIG. 15, after the classification has been generated, the system renders insights from the message (at 1540). As previously noted, insights are categories used to answer some underlying question related to the document. The classifications may map to a given insight based upon the context of the campaign message. A confidence score, and accuracy score, are then generated for the insight.

The inference engine then uses these insights to generate a set of actions using these insights. The inference engine may leverage segments, industry, campaign objectives, client specific instructions and additional parameters. These factors may be consumed by an independent machine learning model (at 1550). While natural language processing models will generate consistent insights given a specific document, the inclusion of the aforementioned factors ensures that the response generated to these insights is dependent upon the specific conversation goals and players. Thus, by using this independent model incorporating these factors, the system may generate very different actions for the same set of insights.

In addition to the segment, industry, client instructions and additional parameters, the independent AI model may also consume third party information, lead history, and historical patterns (at 1560). Third party information may include gleaned demographic data for the lead, credit scores, political affiliations, education, employment information and the like. In some cases the data incorporated will be selected based upon the conversation's goal. For example, if the conversation is related to the sale of a vehicle, the lead's credit history, salary range, family status and housing situation (own vs rent) may all be considered by the system before suggesting a vehicle sale, for example. Expanding the example, if the lead has good financial standing, and is known to have children, the system may include in the message that there is a sale on full sized SUVs and ask the lead if they would like to discuss with the representative financing options. A single individual with less sterling finances may be told they have a great pre-owned selection of sedans. While this example is limited to vehicle sales, in other contexts different subsets of third party information may be of use.

Lastly, the actions are determined by the inference engine using the AI model incorporating all of the above mentioned factors (at 1570) based on the insights originally determined by the NLP models. A lead in the conversation has a single state. The state of the lead defines the objective of the conversation. States and transitions define the objectives already completed for the given lead. States also may include schedules associated to them, and transitions of the given lead's state may be triggered by the content found within the response that was analyzed. Likewise, CRM updates in the client's system may likewise cause a state transition to be triggered. The inference engine may consume information relating to the lead's state in order to determine the current objective when selecting which action to take.

These campaign objectives, as they are updated, may be used to redefine the actions collected and scheduled. For example, 'skip-to-follow-up' action may be replaced with an 'informational message' introducing the sales rep before proceeding to 'series 3' objectives. Additionally, 'Do Not Email' or 'Stop Messaging' classifications should deactivate a lead and remove scheduling at any time during a lead's life-cycle.

Like insights, actions may also be annotated with "facts". For example, if the determined action is to "check back later" this action may be annotated with a date 'fact' that indicates when the action is to be implemented.

Training of the inference engine model may be provided by human annotation of the responses with appropriate actions that should be taken for the response. This annotation requires domain specific information, and thus the annotations/training of the model may be provided by the system's client rather than by a system administrator. A default action model may simultaneously be maintained by an internal system administrator for usage when the domain-specific model is inaccurate or otherwise unavailable.

Returning to FIG. 12, the actions received from the inference engine may be set (at 1240). A determination is made whether there is an action conflict (at 1250). Manual review may be needed when such a conflict exists (at 1270). Otherwise, the actions may be executed by the system (at 1260).

Returning to FIG. 10, after the response has been processed, a determination is made whether to deactivate the lead (at 1075). Such a deactivation may be determined as needed when the lead requests it. If so, then the lead is deactivated (at 1090). If not, the process continues by determining if the campaign for the given lead is complete (at 1080). The campaign may be completed when all objectives for the lead have been met, or when there are no longer messages in the series that are applicable to the given lead. Once the campaign is completed, the lead may likewise be deactivated (at 1090).

However, if the campaign is not yet complete, the process may return to the delay period (at 1020) before preparing and sending out the next message in the series (at 1030). The process iterates in this manner until the lead requests deactivation, or until all objectives are met. This concludes the main process for a comprehensive messaging conversation. Attention will now be focused on the sub-processes that further enhance message classification.

Figure 17:
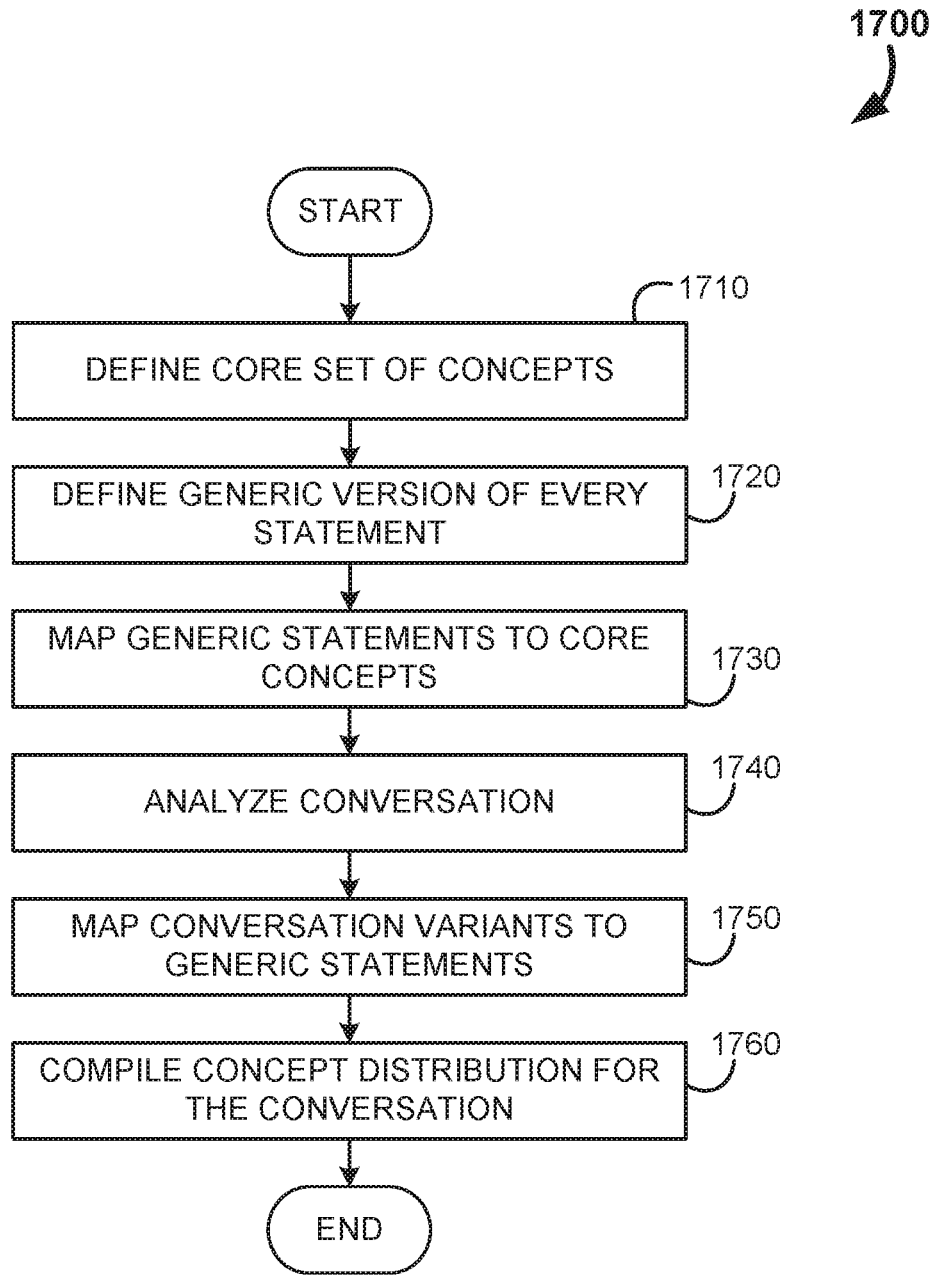
FIG. 17 is an example flow diagram for the process of generating a set of core concepts and cataloging user interactions, in accordance with some embodiment.

Particularly, turning to FIG. 17, a process for defining a core set of concepts and application of the concepts to analyze a corpus is provided, at 1700. This process starts with the basic definition of a set of core concepts (at 1710). These core concepts may be ontological concept associations. The system may also define a set of ideal, generic, and most basic versions of all statements (at 1720). These statements may then be mapped to the core concepts (at 1730).

A conversation corpus may then be taken and analyzed through natural language processors (at 1740) to reduce each statement variant in the corpus to one of the generic versions of the statement (at 1750). For example, "Hi Mike", "Hey Sasha", "How are you, Joe?" and "Dear Maxine" can all be distilled down to a generic statement of "salutations PERSON(S)". In turn this generic statement may be mapped to a core concept of "GREETING".

The system may then compile the concepts and concept distributions for the corpus (at 1760). The distribution of concepts can inform which concepts are most useful for identifying intents. For example, if "GREETING" is consistently present for the a particular intent, and consistently absent for others, it can be a signal for that intent.

Figure 18:
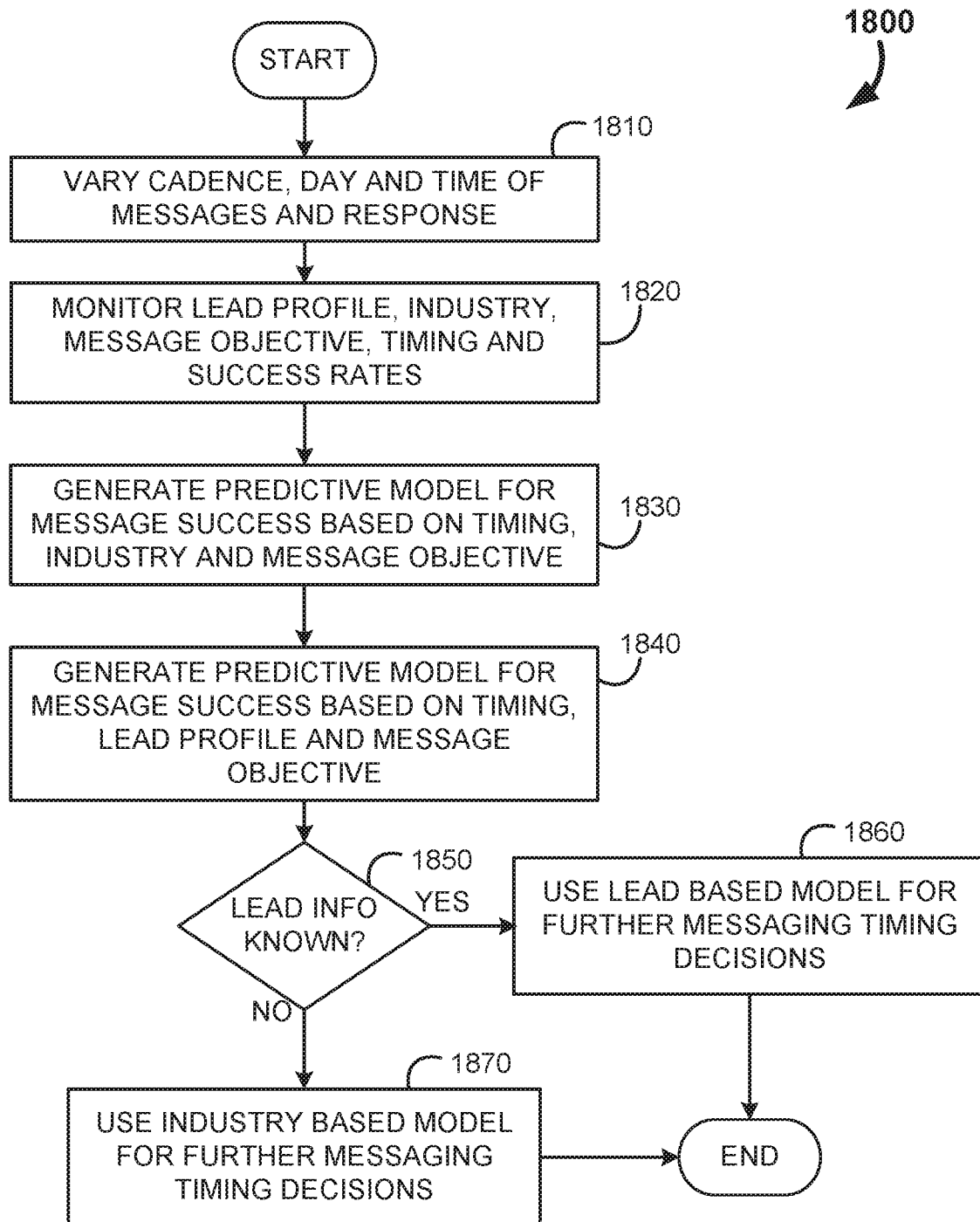
FIG. 18 is an example flow diagram for the process of message cadence testing and modulation, in accordance with some embodiment.

Turning to FIG. 18, a flowchart for an example process for varying message cadence is provided, at 1800. As discussed previously, the cadence of a conversation should appear natural, but should also be selected in a manner that increases the chances of satisfying the conversation's objective. For example, a message sent on a Friday afternoon requesting a detailed task is far less likely to be responded to than one sent earlier in the week. The cadence optimizer, as discussed previously, operates to determine what the 'proper' cadence is based upon likelihood of the message achieving the given goal. This cadence optimization begins with testing different message times, frequency, and cadence of messages and the likelihood of responses (at 1810). The lead in the message, industry, message objective, timing and success rates are all monitored (at 1820) in order to form a predictive model for message success rates. Particularly, two such models are generated: one is modeled based upon message timing in relation to the objective and industry alone (at 1830), whereas the other model is generated based upon these factors, as well as including information based upon the lead's profile information (at 1840).

Subsequently, when a new message is to be sent out, the system may make a determination if lead information is adequately known (at 1850). For a new conversation, or when a new lead has been introduced, this information may be missing or incomplete. Without such lead information, the system may decide upon message timing based on the industry based model (at 1870). However, when lead information is known, the lead based model may alternatively be used (at 1860), as the personality and habits of the lead may be a far better predictor of message response rates than surrogate metric like industry and segment information.

IV. System Embodiments

Figure 19A:
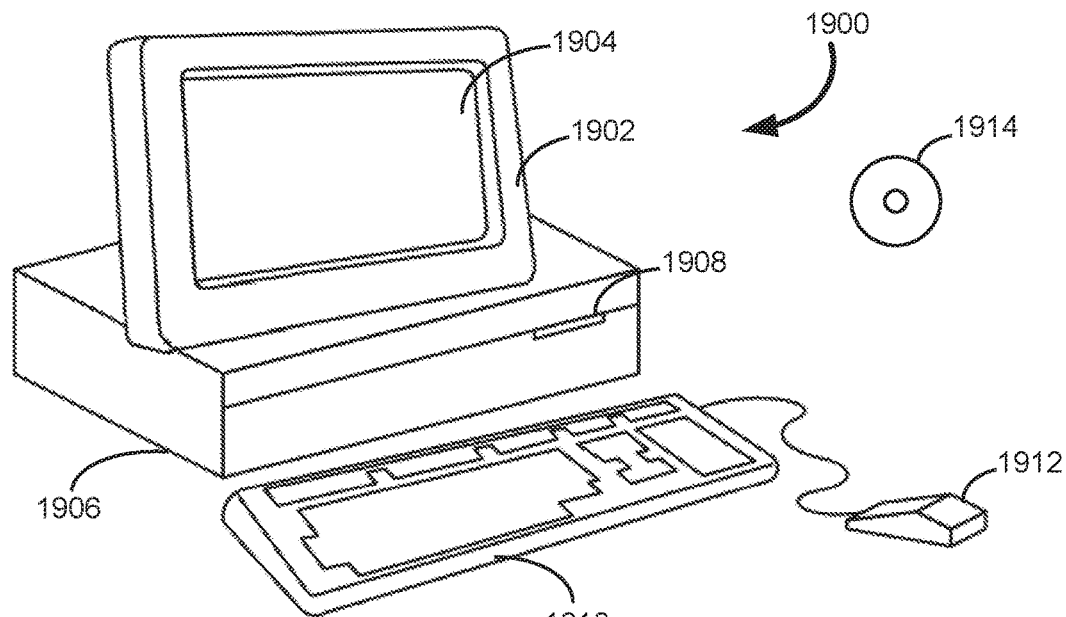
FIGS. 19A and 19B are example illustrations of a computer system capable of embodying the current invention.
Figure 19B:
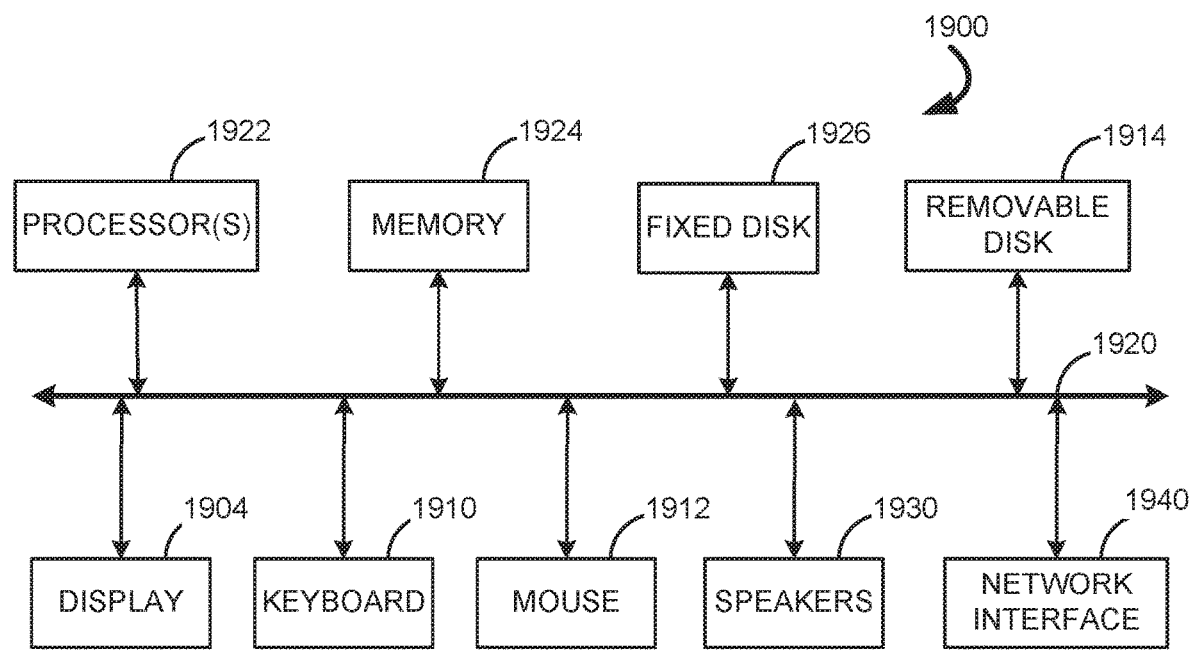

Now that the systems and methods for the campaign generation, message classification, and response to messages have been described, attention shall now be focused upon systems capable of executing the above functions. To facilitate this discussion, FIGS. 19A and 19B illustrate a Computer System 1900, which is suitable for implementing embodiments of the present invention. FIG. 19A shows one possible physical form of the Computer System 1900. Of course, the Computer System 1900 may have many physical forms ranging from a printed circuit board, an integrated circuit, and a small handheld device up to a huge super computer. Computer system 1900 may include a Monitor 1902, a Display 1904, a Housing 1906, a Disk Drive 1908, a Keyboard 1910, and a Mouse 1912. Disk 1914 is a computer-readable medium used to transfer data to and from Computer System 1900.

FIG. 19B is an example of a block diagram for Computer System 1900. Attached to System Bus 1920 are a wide variety of subsystems. Processor(s) 1922 (also referred to as central processing units, or CPUs) are coupled to storage devices, including Memory 1924. Memory 1924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 1926 may also be coupled bi-directionally to the Processor 1922; it provides additional data storage capacity and may also include any of the computer-readable media described below. Fixed Disk 1926 may be used to store programs, data, and the like and is typically a secondary storage medium (such as a hard disk) that is slower than primary storage. It will be appreciated that the information retained within Fixed Disk 1926 may, in appropriate cases, be incorporated in standard fashion as virtual memory in Memory 1924. Removable Disk 1914 may take the form of any of the computer-readable media described below.

Processor 1922 is also coupled to a variety of input/output devices, such as Display 1904, Keyboard 1910, Mouse 1912 and Speakers 1930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 1922 optionally may be coupled to another computer or telecommunications network using Network Interface 1940. With such a Network Interface 1940, it is contemplated that the Processor 1922 might receive information from the network, or might output information to the network in the course of performing the above-described message action determination processes. Furthermore, method embodiments of the present invention may execute solely upon Processor 1922 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 1900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a virtual machine, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

APPENDIX A

| normalized_comment_summary | taxonomical_parent | polarity |
|---|---|---|
| what_request | annotation/question/specific_question/simple_question | neutral |
| are_you_real | annotation/question/specific_question/simple_question | neutral |
| information_request | annotation/request | neutral |
| no_contact | annotation/contact/contact_preferences/contact_method | neutral |
| prefers_XXX_contact | annotation/contact/contact_preferences/contact_method/email_contact_is_fine | neutral |
| XXX_contact_is_fine | annotation/contact/contact_preferences/contact_method | neutral |
| positive_question_response | annotation/question_answer | positive |
| negative_question_response | annotation/question_answer | negative |
| positive_interest_expression | annotation/interest_expression | positive |
| negative_interest_expression | annotation/interest_expression | negative |
| check_back_at_XXX | annotation/contact/contact_preferences/contact_timing/check_back_later | neutral |
| check_back | annotation/contact/contact_preferences/contact_timing/check_back_later | neutral |
| contact_time__XXX | annotation/contact/contact_preferences/contact_timing | neutral |
| no_further_contact | annotation/contact/contact_preferences/contact_timing | negative |
| specific_interest_in__XXX | annotation/interest_expression/positive_interest_expression | positive |
| not_interested_in__XXX | annotation/interest_expression/negative_interest_expression | negative |
| information_request_about__XXX | annotation/request/information_request | neutral |
| client_requests_XXX | annotation/feedback/neutral_feedback | neutral |
| specific_negative_feedback_about__XXX | annotation/feedback/negative_feedback | negative |
| has_some_questions | annotation/question/general_question | neutral |
| contact_info | annotation/contact/contact_information | neutral |
| check_back_later | annotation/contact/contact_preferences/contact_timing | neutral |
| check_back_contingent_on_something | annotation/contact/contact_preferences/contact_timing/check_back_later | neutral |
| client_out_of_office | annotation/contact/contact_preferences/contact_timing/check_back_later | neutral |
| product_or_solution_evaluation_underway | annotation/sales_lifecycle | neutral |
| XXX_is__XXX | annotation/contact/contact_information/contains_contact_info | neutral |
| simple_question | annotation/question/specific_question | neutral |
| how_much_is_it | annotation/question/specific_question/simple_question | neutral |
| already_has_service_or_product | annotation/purchase_history/bought_something | neutral |
| client_called | annotation/contact/history | positive |
| client_in_holding_pattern | annotation/contact/contact_preferences/contact_timing/check_back_later | neutral |
| positive_feedback | annotation/feedback | positive |
| negative_feedback | annotation/feedback | negative |
| difficult_question | annotation/question/specific_question | neutral |
| alternate_contact_person | annotation/contact/contact_information | neutral |
| client_no_longer_with_company | annotation/contact/contact_information | neutral |
| bought_XXX | annotation/purchase_history | neutral |
| internal_discussion_underway | annotation/status | neutral |

APPENDIX A-continued

| normalized_comment_summary | taxonomical_parent | polarity |
|---|---|---|
| client_job_title___XXX | annotation/personal_client_info | neutral |
| client_worked_with___XXX | annotation/personal_client_info/work_history | neutral |
| salutation | annotation/content_structure | neutral |
| valediction | annotation/content_structure | neutral |
| footer_info | annotation/content_structure | neutral |
| disclaimer | annotation/content_structure | neutral |
| neutral_feedback | annotation/feedback | neutral |
| expression_of_gratitude | annotation/feedback/positive_feedback | positive |
| visiting_client_location | annotation/contact | positive |
| client_is_XXX | annotation/personal_client_info | neutral |
| client_wants_to_meet | annotation/contact/contact_preferences/contact_timing/requests_contact | positive |
| automated_response | annotation | neutral |

What is claimed is:

1. A computer implemented method for generating actions to a message comprising:
   receiving at least one insight regarding a message from a natural language processing machine learning model;
   receiving a plurality of objectives;
   receiving a set of completed objectives;
   generating a set of outstanding objectives by comparing the plurality of objectives with the set of completed objectives;
   receiving client specific instructions, and lead historical patterns, wherein the client specific instructions indicates how aggressive the language to be used is, and where the client specific instructions includes message wait length, and order of objective completion, and wherein the lead historical patterns includes response time and effective persuasion techniques;
   tuning a decision making action model using the client specific instructions and lead historical patterns to modify at least one of response time, message content and order of completing the set of outstanding objectives
   applying the tuned model to the insight to generate an action.

2. The method of claim 1, further comprising generating a response message using the generated action.

3. The method of claim 1, further comprising receiving a state for the lead.

4. The method of claim 3, further comprising extracting an objective from the state information for the lead.

5. The method of claim 4, wherein the tuned model is applied to the insight and objective to generate the action.

6. The method of claim 5, wherein the action is directed to cause a state transition of the lead to a preferred state.

7. The method of claim 1, wherein the decision making action model is independent from the natural language processing machine learning model.

8. The method of claim 1, wherein the decision making action model is a machine learning model.

9. The method of claim 8, wherein the decision making action model is trained by annotating the message with actions.

10. The method of claim 9, wherein the annotation is performed in the client domain.

* * * * *